United States Patent
Diez-Andino Sancho

(10) Patent No.: US 11,798,086 B2
(45) Date of Patent: Oct. 24, 2023

(54) METHOD AND SYSTEM FOR DETECTING CAUSES OF MARGIN CALL USING MACHINE LEARNING

(71) Applicant: JPMorgan Chase Bank, N.A., New York, NY (US)

(72) Inventor: Guillermo Diez-Andino Sancho, Geneva (CH)

(73) Assignee: JPMORGAN CHASE BANK, N.A., New York, NY (US)

( * ) Notice: Subject to any disclaimer, the term of this patent is extended or adjusted under 35 U.S.C. 154(b) by 2 days.

(21) Appl. No.: 17/116,425

(22) Filed: Dec. 9, 2020

(65) Prior Publication Data

US 2021/0174450 A1 Jun. 10, 2021

Related U.S. Application Data

(60) Provisional application No. 62/946,096, filed on Dec. 10, 2019.

(51) Int. Cl.
*G06Q 40/06* (2012.01)
*G06N 20/00* (2019.01)

(52) U.S. Cl.
CPC .............. *G06Q 40/06* (2013.01); *G06N 20/00* (2019.01)

(58) Field of Classification Search
CPC ................................ G06Q 40/06; G06N 20/00
USPC ........................................................... 705/36
See application file for complete search history.

(56) References Cited

U.S. PATENT DOCUMENTS

| | | |
|---|---|---|
| 2011/0035414 A1 | 2/2011 | Barton et al. |
| 2012/0041898 A1 | 2/2012 | Shah |
| 2013/0211990 A1 | 8/2013 | Zhong |
| 2017/0206601 A1 | 7/2017 | Weng et al. |
| 2018/0276541 A1* | 9/2018 | Studnitzer .............. G06N 3/045 |
| 2019/0244293 A1 | 8/2019 | Berliner |
| 2019/0347282 A1* | 11/2019 | Cai ........................ G06N 5/022 |

OTHER PUBLICATIONS

International Search Report and Written Opinion of the International Searching Authority in corresponding International Application No. PCT/US 20/64019, dated Mar. 10, 2021.

* cited by examiner

*Primary Examiner* — Edward Chang
(74) *Attorney, Agent, or Firm* — GREENBLUM & BERNSTEIN, P.L.C.

(57) ABSTRACT

A method for identifying and capturing all relevant features involved in a margin call process so that the root cause can be automatically identified by using machine learning is provided. The method includes obtaining data relating to securities portfolios; automatically determining a data pattern relating to triggering a margin call and a corresponding characteristic contributing to triggering the margin call; automatically generating a margin call model based on the data pattern and the characteristic; and evaluating the first securities portfolio using the margin call model to determine the information relating to whether to trigger a first margin call with respect to the first securities portfolio.

16 Claims, 25 Drawing Sheets

FIG. 7

| LOB ▼ | TICKET ID ▼ | CLIENT NAME | ▼ | AGED ▼ | AGING BUCKET ▼ | CLIENT ID ▼ | CAPITAL ADVISOR ▼ | CREDIT EXECUTIVE ▼ | MARGIN CALL AMOUNT USD -1 ▼ |
|---|---|---|---|---|---|---|---|---|---|
| BELOW REGIONAL THRESHOLD ($10K) (67) | | | | | | | | | |
| RESOLVED (29) | | | | | | | | | |
| JB | 7558 | FLWADN, UUTUW (WUU) | | 0 | 0-1 DAY | 9529250 | JOHN DOE | JOHN DOE | -1,204,685.62 |
| JB | 7556 | JOUAZCYHP ETB UQW | | 2 | 2-5 DAYS | 9525903 | JANE DOE | JANE DOE | -37,881.87 |
| JB | 7504 | WBGRAE HTQEGRKKFKO N... | | 7 | 6-10 DAYS | 9734350 | JOHN DOE | JOHN DOE | -27,191.39 |
| JB | 7539 | KFLGEEFZ, L (LTTM LCK) | | 5 | 2-5 DAYS | 9446600 | JANE DOE | JANE DOE | -14,843.10 |
| JB | 7412 | TEJOSNAEC, W (KG MPK) | | 1 | 0-1 DAY | 9484257 | JOHN DOE | JOHN DOE | -11,656.31 |
| JB | 7408 | ILUNMCH MTT KLLWYCX (L... | | 1 | 0-1 DAY | 9688450 | JANE DOE | JANE DOE | -10,679.73 |
| JB | 7571 | ENATHJVNGH, EBKRVDSBE... | | 0 | 0-1 DAY | 9777750 | JOHN DOE | JOHN DOE | -9,925.19 |
| JB | 7399 | LVPWIVMMO QUYR 0 IPRL... | | 27 | 11-29 DAYS | 9681550 | JANE DOE | JANE DOE | -9,794.79 |
| JB | 7280 | LWW & CXT (WK VKB) | | 24 | 11-29 DAYS | 9683451 | JOHN DOE | JOHN DOE | -7,950.20 |
| JB | 7407 | Fnvhwnmlw P yas Y (ZFN 9) | | 25 | 11-29 DAYS | 9620753 | JANE DOE | JANE DOE | 5230.98 |
| JB | 7585 | ZNYT R & HR(OM AAA) | | 1 | 0-1 DAY | | | | -4,934.08 |
| JB | 7494 | FPTK S843390 JJB4386-PTKG | | 11 | 11-29 D | | | | -2,503.70 |
| JB | 7540 | KROYHR, KDQETKT (PBB) | | 3 | 2-5 DA | | | | -2,315.67 |
| JB | 7435 | ZRJRYENS M QFW A (VUZR... | | 21 | 11-29 DAYS | 9866851 | JANE DOE | JANE DOE | -1,733.83 |
| JB | 7561 | REKV, RUCRXDJ | | 0 | 0-1 DAY | 9616750 | JOHN DOE | JOHN DOE | -0.13 |
| JB | 7574 | JPBRSS, WAWVGFKIT (UJP) | | 0 | 0-1 DAY | 9888501 | JANE DOE | JANE DOE | -0.12 |
| JB | 7569 | KDOFKQV,W (JDK LO UDK) | | 0 | 0-1 DAY | 9759216 | JOHN DOE | JOHN DOE | |

Callout: PREDICTED MARGIN CALL CAUSE DATA FED TO THE CONNECT APP VIA A REST API FROM SPLUNK

TOTAL ITEMS: 100

| TOTAL MARGIN CALL AMOUNT USD | UNDERWATER AMOU... | RAG RATING | TEAM |
|---|---|---|---|
| -29,656.55 | 0.00 | UNSET | ASIA-HK TEA... |
| -30,557.18 | 0.00 | UNSET | ASIA HKP-HO... |
| -193,611.71 | 0.00 | UNSET | ASIA HKP-PH... |
| -140,892.65 | 0.00 | UNSET | ASIA HKP-HO... |
| -187,523.85 | 0.00 | UNSET | ASIA HKP-HO... |
| -46,039.67 | 0.00 | UNSET | ASIA SEA-IN... |
| -45,923.41 | 0.00 | GREEN | GFG INDONE... |
| -22,321.30 | 0.00 | UNSET | ASIA HKP-HO... |
| -3,000,079.24 | -3,000,079.24 | UNSET | ASIA SEA-IN... |
| -1,981,749.54 | 0.00 | UNSET | ASIA HKP-HO... |
| -11,923,447.63 | 0.00 | UNSET | GFG HONG K... |
| -3,003,707.93 | -3,008,707.93 | UNSET | ASIA SEA-IN... |
| -4,947,451.56 | 0.00 | UNSET | ASIA HKP-HO... |

| | LOB ∨ TICKET ID ∨ ARRANGEMENT ID ∨ ARRANGEMENT NAME | ∨ CAUSE OF MARGIN CALL | ∨ CAUSE OF MARGIN CAL... | ∨ CAUSE OF CALL VALIDATION ∨ REASON | | |
|---|---|---|---|---|---|---|
| BELOW REGIONAL THRESHOLD ($10K) (10) | | | | | | |
| UNREVIEWED (89) | | | | | | |
| SNG | | | OFFLINE MONITORI... | INVALID MARGIN CAL... | ☐ RETAIN | ☐ CHANGE |
| SNG | | | ACCRUED INTERE... | | ☐ RETAIN | ☐ CHANGE |
| SNG | | | ACCRUED INTERE... | | ☐ RETAIN | ☐ CHANGE |
| SNG | | | ACCRUED INTERE... | | ☐ RETAIN | ☐ CHANGE |
| SNG | | | UNKNOWN | | ☐ RETAIN | ☐ CHANGE |
| SNG | | | OFFLINE MONITORI... | | ☐ RETAIN | ☐ CHANGE |
| SNG | | | UNKNOWN | | ☐ RETAIN | ☐ CHANGE |
| SNG | | | ACCRUED INTERE... | | ☐ RETAIN | ☐ CHANGE |
| SNG | | | OFFLINE MONITORI... | | ☐ RETAIN | ☐ CHANGE |
| SNG | | | OFFLINE MONITORI... | | ☐ RETAIN | ☐ CHANGE |
| SNG | | | UNKNOWN | | ☐ RETAIN | ☐ CHANGE |
| SNG | | MARKET DEPRECIATION | ACCRUED INTERE... | | ☐ RETAIN | ☐ CHANGE |
| TOTAL ITEMS: 99 | | | | | | |

GCM MARGIN CALLS UI  CONNECT 1.3.1

GCM MARGIN CALLS    WELCOME DUMMY USER

FOR INTERNAL USE ONLY. 2020 JPMORGAN CHASE & CO. ALL RIGHTS RESE

| TOTAL MARGIN CALL AMOUNT USD | UNDERWATER AMO... | RAG RATING | TEAM | DEF CMI |
|---|---|---|---|---|
| -80,873,387.11 | -80,873,235.85 | UNSET | ASIA SEA-IN.. | NO |
| -20,013,922.22 | -20,013,922.22 | UNSET | ASIA NRI-SG T.. | NO |
| -20,013,844.44 | -20,013,844.44 | UNSET | ASIA NRI-SG T.. | NO |
| -20,010,150.00 | -20,010,150.00 | UNSET | ASIA NRI-SG T.. | NO |
| -13,973,023.23 | 0.00 | UNSET | ASIA HKP-HO.. | NO |
| -11,923,447.63 | 0.00 | UNSET | GFG HONG KO.. | NO |
| -7,459,870.42 | -1,097,405.48 | GREEN | ASIA HKP-HO.. | NO |
| -4,994,698.13 | -2,815,499.21 | UNSET | ASIA SEA-IN.. | NO |
| -4,947,451.56 | 0.00 | UNSET | ASIA HKP-HO.. | NO |
| -4,309,810.36 | 0.00 | UNSET | GFG INDONESI.. | NO |
| -3,950,966.56 | 0.00 | GREEN | ASIA NRI-SG T.. | NO |
| -3,051,483.87 | 0.00 | UNSET | ASIA HKP-HO.. | NO |
| -3,008,707.93 | -3,008,707.93 | UNSET | ASIA SEA-IN.. | NO |

GCM MARGIN CALLS UI    CONNECT1.3.1

TICKET# SNG-583961 (READ-ONLY) - UNREVIEWED

| STATUS | LOB SNG | ARRANGEMENT ID | ARRANGEMENT NAME | CLIENT ID | CLIENT NAME/ARRANGEMENT OWNER | TOTAL MARGIN CALL AMOUNT USD -3,234.72 |
|---|---|---|---|---|---|---|

POSITIONS | CLIENT PROFILE | COMMENTS

ASSETS SUMMARY (IN USD)

| SAC LEVEL 1 | MV (USD) | PREVIOUS DAY MV (USD) | DIFFERENCE MV (USD) | POST-HAIRCUT ELV (USD) | PREVIOUS DAY POST-HAIRCUT ELV (USD) | DIFFERENCE POST-HAIRCUT ELV (USD) |
|---|---|---|---|---|---|---|
| ALTERNATIVE INVEST... | 1,071,963.83 | 0.00 | 1,071,963.83 | 0.00 | 0.00 | 0.00 |
| CASH | 23,476.76 | 0.00 | 23,476.76 | 22,302.92 | 0.00 | 22,302.92 |
| TOTAL | 1,095,440.60 | 0.00 | 1,095,440.60 | 22,302.92 | 0.00 | 22,302.92 |

LIABILITIES SUMMARY (IN USD)

| SAC LEVEL 1 | MV (USD) | PREVIOUS DAY MV (USD) | DIFFERENCE MV (USD) | NLV (USD) | PREVIOUS DAY NLV (USD) | DIFFERENCE NLV (USD) |
|---|---|---|---|---|---|---|
| TOTAL | 0.00 | 0.00 | 0.00 | 0.00 | 0.00 | 0.00 |

DERIVATIVES SUMMARY (IN USD)

| SAC LEVEL 1 | MV (USD) | PREVIOUS DAY MV (USD) | DIFFERENCE MTM (USD) | INITIAL MARGIN (USD) | PREVIOUS DAY INITIAL MARGIN (USD) | DIFFERENCE INITIAL MARGIN (USD) |
|---|---|---|---|---|---|---|
| TOTAL | 0.00 | 0.00 | 0.00 | 0.00 | 0.00 | 0.00 |

GCM MARGIN CALLS UI    CONNECT 1.3.1    CCY: USD

IM MARGIN CALLS

LOB · TICKET ID · ARRANGEMENT ID · ARRANGEMENT... ...ERWATER AMO... · RAG RATING · TEAM    DEF  CMI

OW REGIONAL THRESHOLD ($10K) (1)    583961

| TICKET # 583961 | × |
|---|---|
| CAUSE OF MARGIN CALL: PRIVATE EQUITY CAPITAL CALL | |
| SUMMARY | USD |
| AVAILABLE COLLATERAL TODAY | -3,234.72 |
| AVAILABLE COLLATERAL YESTERDAY | 68,506.67 |
| TOTAL ASSET COLLATERAL LENDING VALUE | 112.88 |
| TOTAL ASSET COLLATERAL LENDING VALUE YESTERDAY | 72,112.28 |
| TOTAL HAIRCUT TODAY | -5.64 |
| TOTAL HAIRCUT YESTERDAY | -3,605.61 |
| ACCRUED INTERESTED TODAY | 0.00 |
| ACCRUED INTEREST YESTERDAY | 0.00 |
| DERIVATIVE IM EXPOSURE TODAY | 0.00 |
| DERIVATIVE IM EXPOSURE YESTERDAY | 0.00 |
| CLOSE | |

SNG    0.00    UNSET    ASIA-HK TEA...NO

TICKET# 621631                                                                    ×

CHANGE AI CAUSE OF MARGIN CALL:

○ I WAS ABLE TO UNDERSTAND THE CAUSE OF CALLS BASED ON THE AI FEATURES
○ I WAS NOT ABLE TO UNDERSTAND THE CAUSE OF CALLS BASED ON THE AI FEATURES
○ I WAS PARTIALLY ABLE TO UNDERSTAND THE CAUSE OF CALLS BASED ON THE FEATURES

[SAVE] [CLOSE]

TICKET# 621631                                                              ✕

CHANGE AI CAUSE OF MARGIN CALL: NEW PURCHASES/TRADES

⊙ I WAS ABLE TO UNDERSTAND THE CAUSE OF CALLS BASED ON THE AI FEATURES
○ I WAS NOT ABLE TO UNDERSTAND THE CAUSE OF CALLS BASED ON THE AI FEATURES
○ I WAS PARTIALLY ABLE TO UNDERSTAND THE CAUSE OF CALLS BASED ON THE FEATURES

PLEASE SELECT THE FEATURES THAT WERE USEFUL DURING YOUR CAUSE OF CALL ANALYSIS:

| SUMMARY | FEATURES USED FOR DETERMINATION |
|---|---|
| AVAILABLE COLLATERAL YESTERDAY | ☑ |
| TOTAL ASSET COLLATERAL LENDING VALUE | ☑ |
| TOTAL ASSET COLLATERAL LENDING VALUE YESTERDAY | ☑ |
| TOTAL HAIRCUT TODAY | ☐ |
| TOTAL HAIRCUT YESTERDAY | ☐ |
| ACCRUED INTERESTED TODAY | ☐ |
| ACCRUED INTEREST YESTERDAY | ☐ |
| DERIVATIVE IM EXPOSURE TODAY | ☐ |
| DERIVATIVE IM EXPOSURE YESTERDAY | ☐ |
| DERIVATIVE MTM EXPOSURE TODAY | ☐ |

COMMENTS
CAUSE OF CALL FEATURES FEEDBACK COMMENT

985 CHARACTERS LEFT

[SAVE] [CLOSE]

FIG. 19B

METHOD AND SYSTEM FOR DETECTING CAUSES OF MARGIN CALL USING MACHINE LEARNING

CROSS-REFERENCE TO RELATED APPLICATIONS

This application claims the benefit of U.S. Provisional Patent Application Ser. No. 62/946,096, filed Dec. 10, 2019, which is hereby incorporated by reference in its entirety.

BACKGROUND

1. Field of the Disclosure

This technology generally relates to methods and systems for detecting causes of margin calls, and more particularly to methods and systems for identifying and capturing all relevant features involved in a margin call process so that the root cause can be automatically identified by using machine learning.

2. Background Information

Today, many financial institutions utilize margin calls to ensure that an investor on credit stays within a maintenance margin. Historically, the decision to make a margin call on an investor is made after the fact to varying degrees of success with respect to mitigating investment risks.

One drawback of using conventional forms of analysis to determine whether a margin call is necessary for an investor is that in many instances, the analysis is inefficiently completed using multiple systems and multiple data elements after the portfolio has already crossed an arbitrary threshold. In addition to this, the process is manual and there is a subjectivity factor on it due to the human interpretation of the data across different regions. As a result, the financial institution issuing the margin call expends large amounts of resources for after the fact information which inefficiently mitigate risks.

Therefore, there is a need for transaction modeling which provides an investor with information relating to various factors that led to a margin call so that the investor may efficiently correct any deficiencies. Further, there is also a need for transaction modeling which provides a financial institution with information in anticipation of a margin call so that the financial institution may correct deficiencies without unnecessary risk exposure. Finally, there is a need to standardize the margin call process, how the margin call features are interpreted across regions, and different locations so that there is one unique interpretation where human bias is removed.

SUMMARY

The present disclosure, through one or more of its various aspects, embodiments, and/or specific features or sub-components, provides, inter alia, various systems, servers, devices, methods, media, programs, and platforms for identifying and capturing all relevant features involved in a margin call process so that the root cause can be automatically identified by using machine learning.

According to an aspect of the present disclosure, a method for identifying and capturing all relevant features involved in a margin call process so that the root cause can be automatically identified is provided. The method is implemented by at least one processor. The method may include obtaining a plurality of data relating to a plurality of securities portfolios; automatically determining, using the plurality of data, at least one data pattern relating to triggering a margin call and at least one corresponding characteristic contributing to triggering the margin call; automatically generating at least one margin call model based on the at least one data pattern and the at least one characteristic; and evaluating the first securities portfolio using the at least one margin call model to determine a first information relating to whether to trigger a first margin call with respect to the first securities portfolio.

In accordance with an exemplary embodiment, the evaluating may include selecting, by the at least one processor, a first one of the at least one data pattern and a first one of the at least one corresponding characteristic relating to triggering the first margin call for the first securities portfolio; and displaying, by the at least one processor via a display, the first information on a graphical user interface together with the selected first one of the at least one data pattern and the selected first one of the at least one corresponding characteristic.

In accordance with an exemplary embodiment, the at least one margin call model may be generated automatically using machine learning analysis of the plurality of data.

In accordance with an exemplary embodiment, the at least one margin call model may include at least one from among a data model, a mathematical model, a process model, and a machine learning model.

In accordance with an exemplary embodiment, the method may further include evaluating a second securities portfolio using the at least one margin call model to determine a second information relating to whether to trigger a future second margin call with respect to the second securities portfolio; and displaying, via a display, the second information on a graphical user interface.

In accordance with an exemplary embodiment, the graphical user interface may include at least one dashboard that displays at least one from among monitoring information relating to the first securities portfolio and classification information relating to the at least one characteristic.

In accordance with an exemplary embodiment, the at least one characteristic may include at least one of a securities appreciation characteristic, a securities depreciation characteristic, an assets market value difference characteristic, a securities market value difference characteristic, a securities market value buy characteristic, an exposure difference characteristic, a cash market value difference characteristic, a collateral difference characteristic, a cash market value sell characteristic, a haircut difference characteristic, a securities market value sell characteristic, a securities liquidation value buy characteristic, a cash market value appreciation characteristic, a cash market value depreciation characteristic, a pledge market value out characteristic, a pledge market value difference characteristic, a cash market value buy characteristic, a derivative exposure delta characteristic, a derivative initial margin exposure delta characteristic, a pledge liquidation value in characteristic, an accrued interest accumulation characteristic, a pledge market value in characteristic, a pledge market value appreciation characteristic, a pledge market value depreciation characteristic, a derivative negative mark-to-market delta characteristic, and an unlimited pledge difference characteristic.

In accordance with an exemplary embodiment, the method may further include receiving, via a graphical user interface, feedback information from at least one user; and updating the at least one margin call model based on the feedback information.

In accordance with an exemplary embodiment, the feedback information includes at least one from among a first information accuracy ranking, a second information accuracy ranking, and a characteristic accuracy ranking.

In accordance with an exemplary embodiment, the method may further include parsing the plurality of data; identifying, in the parsed plurality of data, personally identifiable information; and anonymizing the plurality of data by removing the identified personally identifiable information.

According to an aspect of the present disclosure, a computing device configured to implement an execution of a method for identifying and capturing all relevant features involved in a margin call process so that the root cause can be automatically identified is disclosed. The computing device comprising a processor; a memory; and a communication interface coupled to each of the processor and the memory, wherein the processor may be configured to obtain a plurality of data relating to a plurality of securities portfolios; automatically determine, by using the plurality of data, at least one data pattern relating to triggering a margin call and at least one corresponding characteristic contributing to triggering the margin call; automatically generate at least one margin call model based on the at least one data pattern and the at least one characteristic; and evaluate the first securities portfolio using the at least one margin call model to determine a first information relating to whether to trigger a first margin call with respect to the first securities portfolio.

In accordance with an exemplary embodiment, for the evaluating, the processor may be further configured to select a first one of the at least one data pattern and a first one of the at least one corresponding characteristic relating to triggering the first margin call for the first securities portfolio; and display, via a display, the first information on a graphical user interface together with the selected first one of the at least one data pattern and the selected first one of the at least one corresponding characteristic.

In accordance with an exemplary embodiment, the processor may be further configured to automatically generate the at least one margin call model by using machine learning analysis of the plurality of data.

In accordance with an exemplary embodiment, the at least one margin call model may include at least one from among a data model, a mathematical model, a process model, and a machine learning model.

In accordance with an exemplary embodiment, the processor may be further configured to evaluate a second securities portfolio using the at least one margin call model to determine a second information relating to whether to trigger a future second margin call with respect to the second securities portfolio; and display, via a display, the second information on a graphical user interface.

In accordance with an exemplary embodiment, the graphical user interface may include at least one dashboard that displays at least one from among monitoring information relating to the first securities portfolio and classification information relating to the at least one characteristic.

In accordance with an exemplary embodiment, the at least one characteristic may include at least one from among a securities appreciation characteristic, a securities depreciation characteristic, an assets market value difference characteristic, a securities market value difference characteristic, a securities market value buy characteristic, an exposure difference characteristic, a cash market value difference characteristic, a collateral difference characteristic, a cash market value sell characteristic, a haircut difference characteristic, a securities market value sell characteristic, a securities liquidation value buy characteristic, a cash market value appreciation characteristic, a cash market value depreciation characteristic, a pledge market value out characteristic, a pledge market value difference characteristic, a cash market value buy characteristic, a derivative exposure delta characteristic, a derivative initial margin exposure delta characteristic, a pledge liquidation value in characteristic, an accrued interest accumulation characteristic, a pledge market value in characteristic, a pledge market value appreciation characteristic, a pledge market value depreciation characteristic, a derivative negative mark-to-market delta characteristic, a lending value fluctuation due to foreign exchange movements characteristic, private equity calls or accrued interest debited with a future value date characteristic, and an unlimited pledge difference characteristic.

In accordance with an exemplary embodiment, the processor may be further configured to receive, via a graphical user interface, feedback information from at least one user; and update the at least one margin call model based on the feedback information.

In accordance with an exemplary embodiment, the feedback information may include at least one from among a first information accuracy ranking, a second information accuracy ranking, and a characteristic accuracy ranking.

In accordance with an exemplary embodiment, the processor may be further configured to parse the plurality of data; identify, in the parsed plurality of data, personally identifiable information; and anonymizing the plurality of data by removing the identified personally identifiable information.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 10 is a screenshot that illustrates a graphical user interface of unclassified tickets that is usable for implementing a method for identifying and capturing all relevant features involved in a margin call process so that the root cause can be automatically identified by using machine learning, according to an exemplary embodiment.

FIG. 12 is a screenshot that illustrates a graphical user interface of classification confirmation that is usable for implementing a method for identifying and capturing all relevant features involved in a margin call process so that the root cause can be automatically identified by using machine learning, according to an exemplary embodiment.

FIG. 13 is a screenshot that illustrates a graphical user interface of classified tickets that is usable for implementing a method for identifying and capturing all relevant features involved in a margin call process so that the root cause can be automatically identified by using machine learning, according to an exemplary embodiment.

FIG. 14B is a screenshot that illustrates a graphical user interface of ticket details that is usable for implementing a method for identifying and capturing all relevant features involved in a margin call process so that the root cause can be automatically identified by using machine learning, according to an exemplary embodiment.

FIG. 18 is a show model illustrating feature interactions that is usable for implementing a method for identifying and capturing all relevant features involved in a margin call process so that the root cause can be automatically identified by using machine learning, according to an exemplary embodiment.

FIG. 19A is a screenshot that illustrates a graphical user interface of a user feedback form that is usable for implementing a method for identifying and capturing all relevant features involved in a margin call process so that the root cause can be automatically identified by using machine learning, according to an exemplary embodiment.

FIG. 19B is a screenshot that illustrates an expanded graphical user interface that is displayed based on user input in a user feedback form that is usable for implementing a method for identifying and capturing all relevant features involved in a margin call process so that the root cause can be automatically identified by using machine learning, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
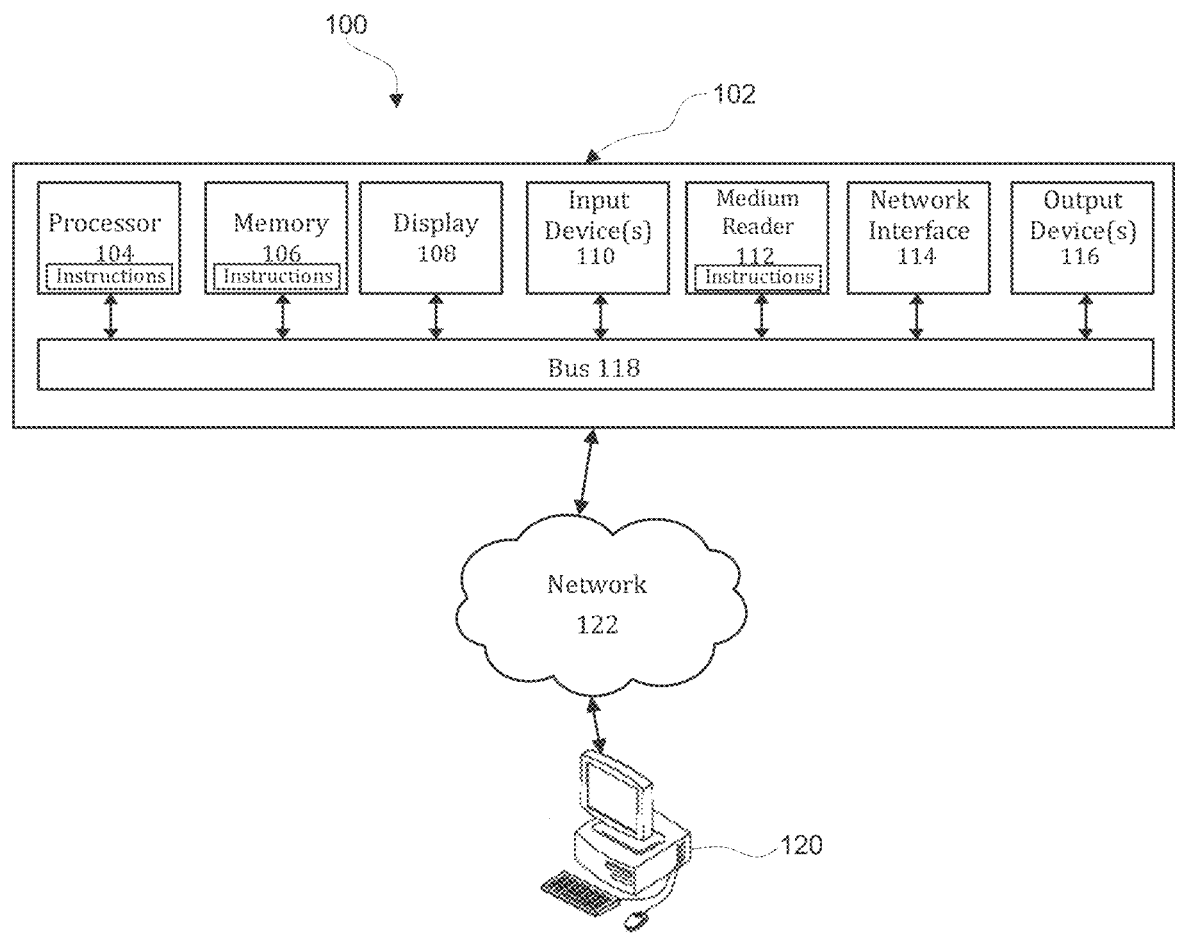
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for identifying and capturing all relevant features involved in a margin call process so that the root cause can be automatically identified by using machine learning.

Figure 2:
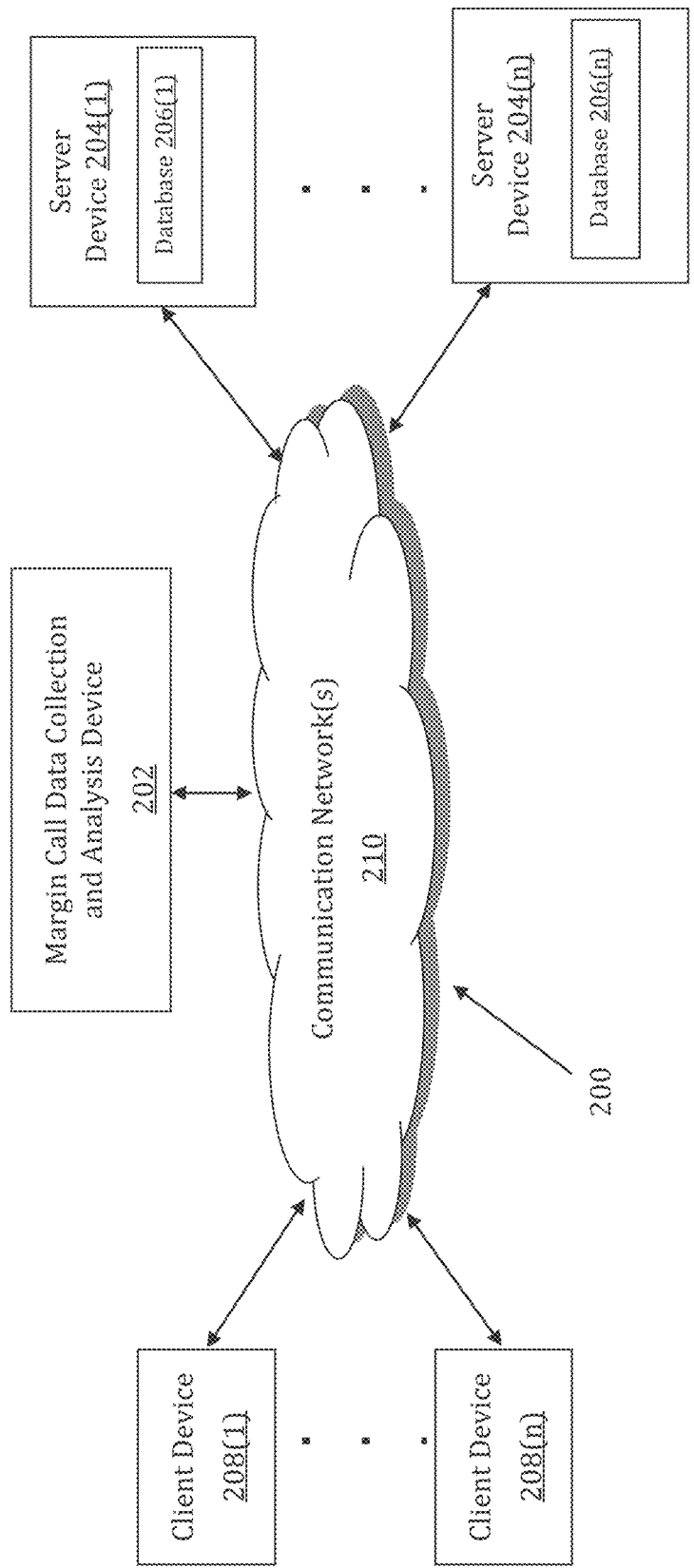
FIG. 2 illustrates an exemplary diagram of a network environment.

Referring to FIG. 2, a schematic of an exemplary network environment 200 for implementing a method for identifying and capturing all relevant features involved in a margin call process so that the root cause can be automatically identified by using machine learning is illustrated. In an exemplary embodiment, the method is executable on any networked computer platform, such as, for example, a personal computer (PC).

The method for identifying and capturing all relevant features involved in a margin call process so that the root cause can be automatically identified by using machine learning may be implemented by a Margin Call Data Collection and Analysis (MCDCA) device 202. The MCDCA device 202 may be the same or similar to the computer system 102 as described with respect to FIG. 1. The MCDCA device 202 may store one or more applications that can include executable instructions that, when executed by the MCDCA device 202, cause the MCDCA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MCDCA device 202 itself, may be located in virtual server(s) running in a cloud-based computing environment rather than being tied to one or more specific physical network computing devices. Also, the application(s) may be running in one or more virtual machines (VMs) executing on the MCDCA device 202. Additionally, in one or more embodiments of this technology, virtual machine(s) running on the MCDCA device 202 may be managed or supervised by a hypervisor.

In the network environment 200 of FIG. 2, the MCDCA device 202 is coupled to a plurality of server devices 204(1)-204(n) that hosts a plurality of databases 206(1)-206(n), and also to a plurality of client devices 208(1)-208(n) via communication network(s) 210. A communication interface of the MCDCA device 202, such as the network interface 114 of the computer system 102 of FIG. 1, operatively couples and communicates between the MCDCA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MCDCA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and MCDCA devices that efficiently implement a method for identifying and capturing all relevant features involved in a margin call process so that the root cause can be automatically identified by using machine learning.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MCDCA device 202 may be a standalone device or integrated with one or more other devices or apparatuses, such as one or more of the server devices 204(1)-204(n), for example. In one particular example, the MCDCA device 202 may include or be hosted by one of the server devices 204(1)-204(n), and other arrangements are also possible. Moreover, one or more of the devices of the MCDCA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MCDCA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to margin calls, data patterns, characteristics, and margin call models.

Although the server devices 204(1)-204(n) are illustrated as single devices, one or more actions of each of the server devices 204(1)-204(n) may be distributed across one or more distinct network computing devices that together comprise one or more of the server devices 204(l)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the MCDCA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the MCDCA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the MCDCA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MCDCA device 202, the server devices 204(1)-204(n), or the client devices 208(1)-208(n), for example, may be configured to operate as virtual instances on the same physical machine. In other words, one or more of the MCDCA device 202, the server devices 204(1)-204(n), or the client devices 208(1)-208(n) may operate on the same physical device rather than as separate devices communicating through communication network(s) 210. Additionally, there may be more or fewer MCDCA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
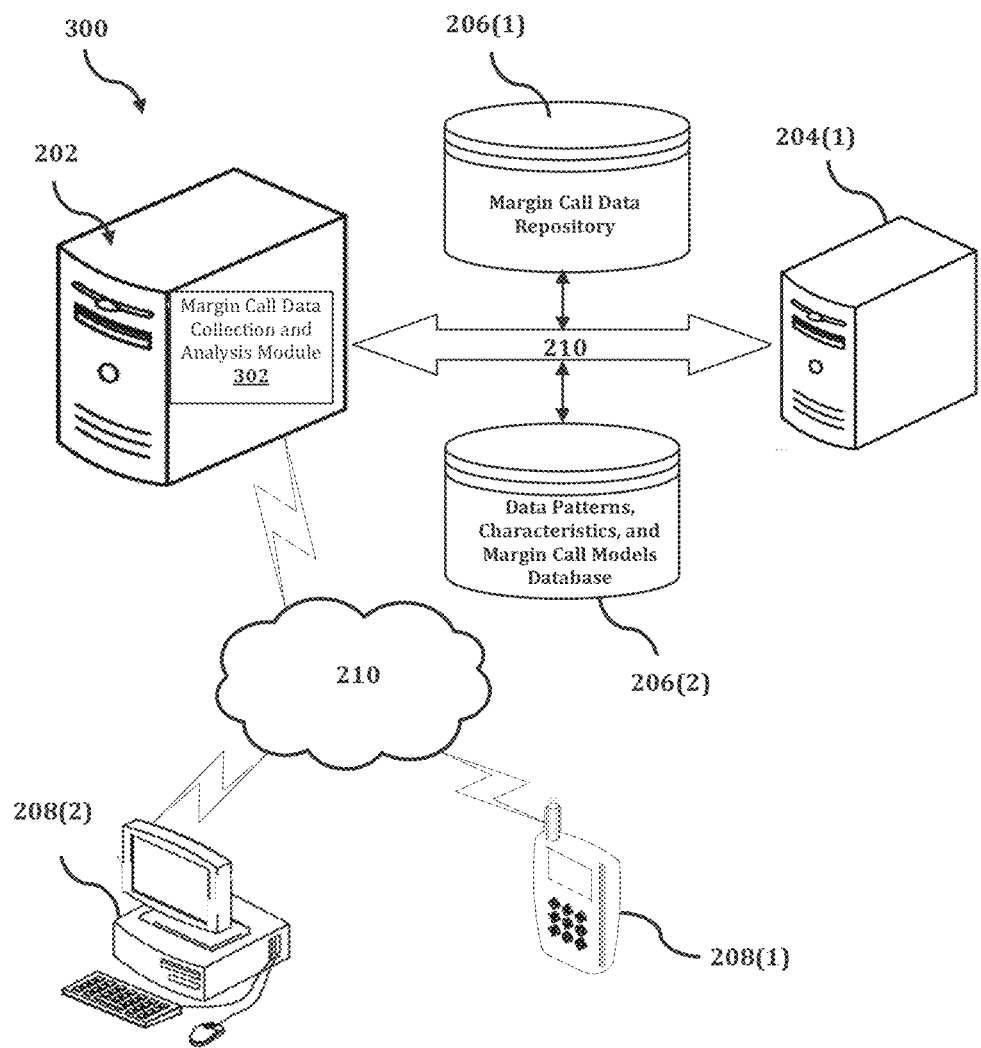
FIG. 3 shows an exemplary system for implementing a method for identifying and capturing all relevant features involved in a margin call process so that the root cause can be automatically identified by using machine learning.

The MCDCA device 202 is described and illustrated in FIG. 3 as including a Margin Call Data Collection and Analysis (MCDCA) module 302, although it may include other rules, policies, modules, databases, or applications, for example. As will be described below, the MCDCA module 302 is configured to implement a method for identifying and capturing all relevant features involved in a margin call process so that the root cause can be automatically identified by using machine learning.

An exemplary process 300 for implementing a mechanism for identifying and capturing all relevant features involved in a margin call process so that the root cause can be automatically identified by utilizing the network environment of FIG. 2 is illustrated as being executed in FIG. 3. Specifically, a first client device 208(1) and a second client device 208(2) are illustrated as being in communication with MCDCA device 202. In this regard, the first client device 208(1) and the second client device 208(2) may be "clients" of the MCDCA device 202 and are described herein as such. Nevertheless, it is to be known and understood that the first client device 208(1) and/or the second client device 208(2) need not necessarily be "clients" of the MCDCA device 202, or any entity described in association therewith herein. Any additional or alternative relationship may exist between either or both of the first client device 208(1) and the second client device 208(2) and the MCDCA device 202, or no relationship may exist.

Further, MCDCA device 202 is illustrated as being able to access a margin call data repository 206(1) and a data patterns, characteristics, and margin call models database 206(2). The MCDCA module 302 may be configured to access these databases for implementing a method for identifying and capturing all relevant features involved in a margin call process so that the root cause can be automatically identified by using machine learning.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the MCDCA device 202 via broadband or cellular communication. Of course, these embodiments are merely exemplary and are not limiting or exhaustive.

Upon being started, the MCDCA module 302 executes a process for identifying and capturing all relevant features involved in a margin call process so that the root cause can be automatically identified by using machine learning. An exemplary process for identifying and capturing all relevant features involved in a margin call process so that the root cause can be automatically identified by using machine learning is generally indicated at flowchart 400 in FIG. 4.

Figure 4:
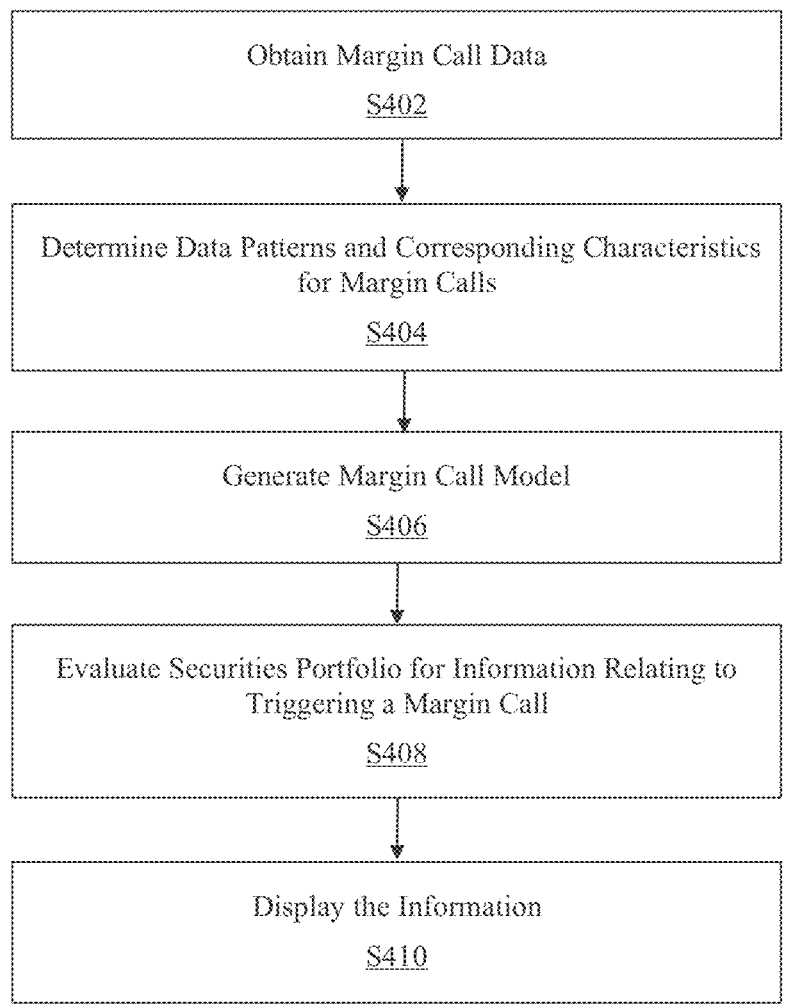
FIG. 4 is a flowchart of an exemplary process for implementing a method for identifying and capturing all relevant features involved in a margin call process so that the root cause can be automatically identified by using machine learning.

In process 400 of FIG. 4, at step S402, data relating to a plurality of securities portfolios may be obtained. In an exemplary embodiment, the data may include information that relates to securities portfolios of a plurality of investors. In another exemplary embodiment, the plurality of investors may include unrelated entities and/or related entities (i.e., a subsidiary entity) and the plurality of investors may also include individual investors and/or institutional investors (i.e., a hedge fund).

In another exemplary embodiment, the data may be parsed and anonymized to remove personal identifying information corresponding to the plurality of investors. In another exemplary embodiment, the securities portfolios may include a grouping of any financial assets such as, for example, stocks, bonds, commodities, currencies, cash equivalents, mutual funds, exchange-traded funds, and closed funds. Other types of non-tradable instruments such as, for example, time deposits, pledge received, and guarantees may also be part of the portfolio. Additionally, the securities portfolios may also include non-publicly tradable securities such as, for example, real estate, art, and private investments.

In another exemplary embodiment, the data may be obtained from any publicly accessible sources (i.e., stock market data from an exchange) and privately held sources (i.e., account data from a bank). In another exemplary embodiment, the data may include any information such as, for example, transaction type data, stock price data, asset volume data, and bond yield data related to each of the financial assets within the securities portfolio.

In another exemplary embodiment, the transaction type data may reference any trading orders such as, for example, a market order, a limit order, a stop order (i.e., a stop-loss order), and a buy stop order. In another exemplary embodiment, the transaction type data may reference any demand of an investor by a financial institution such as, for example, a federal margin call, a maintenance margin call, and an exchange margin call related to the investor's securities portfolio. As will be appreciated by a person of ordinary skill in the art, the transaction type data may reference any transaction, and corresponding transaction information, related to each of the securities within a securities portfolio.

At step S404, data patterns relating to triggering a margin call and corresponding characteristics contributing to triggering the margin call may be automatically determined using the data. In an exemplary embodiment, the margin call may include a generalized margin call scenario resulting from analysis of the obtained data. In another exemplary embodiment, the margin call may include a predetermined scenario established by an organization as a standard trigger for a margin call.

In another exemplary embodiment, analyzing the data to automatically determine the data patterns and the characteristics may include comparing predeveloped analytical models to the data. In another exemplary embodiment, analyzing the data to automatically determine the data patterns and the characteristics may include utilizing machine learning analytical techniques on the data. In another exemplary embodiment, machine learning analytical techniques may include supervised learning algorithms such as, for example, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process, etc.

In another exemplary embodiment, the data patterns may be determined using historical data pattern recognition techniques (i.e., comparing to known data patterns in historical data) and statistical recognition pattern techniques (i.e., machine learning and artificial intelligence related recognition of patterns and regularities in data). For example, in historical data pattern recognition techniques, a first data may be received and may be compared to predeveloped data patterns for securities portfolios known to have triggered a margin call in the past. Alternatively, for example, in statistical recognition pattern techniques, data of past margin calls may be analyzed by a computing system using algorithms that enable the computing system to identify the data patterns. The identified data patterns may then be applied to the first security portfolio to predict the probability of a margin call for the first securities portfolio.

In an exemplary embodiment, the characteristics may be automatically determined using the machine learning analytical techniques described above based on the data patterns. In another exemplary embodiment, the characteristics may include a contributing factor to the margin call and/or a root cause of the margin call based on magnitude of impact. For example, a falling value of Bond A may contribute to a margin call already in effect because of a falling price for Stock B. In another exemplary embodiment, the magnitude of impact for each of the characteristics may be expressed as a percentage of actual contribution to the margin call and as a probability percentage of contribution to the margin call.

In another exemplary embodiment, the characteristics may include at least one of a securities appreciation characteristic, a securities depreciation characteristic, an assets market value difference characteristic, a securities market value difference characteristic, a securities market value buy characteristic, an exposure difference characteristic, a cash market value difference characteristic, a collateral difference characteristic, a cash market value sell characteristic, a haircut difference characteristic, a securities market value sell characteristic, a securities liquidation value buy characteristic, a cash market value appreciation characteristic, a cash market value depreciation characteristic, a pledge market value out characteristic, a pledge market value difference characteristic, a cash market value buy characteristic, a derivative exposure delta characteristic, a derivative initial margin exposure delta characteristic, a pledge liquidation value in characteristic, an accrued interest accumulation characteristic, a pledge market value in characteristic, a pledge market value appreciation characteristic, a pledge market value depreciation characteristic, a derivative negative mark-to-market delta characteristic, a lending value fluctuation due to foreign exchange movements characteristic, private equity calls or accrued interest debited with a future value date characteristic, and an unlimited pledge difference characteristic.

At step S406, margin call models based on the data patterns and the characteristics may be automatically generated. In an exemplary embodiment, the margin call models may include a mathematical model such as, for example, a financial model designed to represent a real-world financial situation. In another exemplary embodiment, the margin call models may include a mathematical model representing the potential of a margin call for any given securities portfolio. In another exemplary embodiment, the margin call models may be generated for any of the above described transaction types. In another exemplary embodiment, the margin call models may be automatically generated to represent specific analytics such as, for example, projected risk analysis and projected outcome analysis. In another exemplary embodiment, the margin call models may be generated using any combination of the data patterns and the characteristics.

In another exemplary embodiment, the margin call models may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, the holdout method, the K-fold-cross-validation method, and the bootstrap method determine that the model's true positive rate, true negative rate, false positive rate, and false negative rates correspond to predetermined ranges. In another exemplary embodiment, the training model may be operable (i.e., actively utilized by an organization) while continuing to be trained using new data. In another exemplary embodiment, the margin call models may be generated using at least one of an artificial neural network technique, a decision tree technique, a support vector machines technique, a Bayesian network technique, and a genetic algorithms technique.

In another exemplary embodiment, the margin call models may be trained based on at least one attribute. The attribute may correspond to internally obtainable as well as externally retrieved data. The attribute may include at least one from among a ticket value, a platform value, a date value, an available collateral today value, an available collateral yesterday value, a total lending value today value, a total lending value yesterday value, a total haircut today value, a total haircut yesterday value, an accrued interest today value, an accrued interest yesterday value, a derivative initial margin (IM) exposure today value, a derivative market-to-marker (MTM) exposure today value, a derivative IM exposure yesterday value, a derivative MTM exposure yesterday value, a total exposure today value, a total exposure yesterday value, a securities liquid value (LV) today value, a securities LV yesterday value, an unlimited cross pledge today value, an unlimited cross pledge yesterday value, a limited cross pledge LV today value, a limited cross pledge LV yesterday value, a mortgage property value LV value, a mortgage exposure value, a market value (MV) purchased securities value, a lending value purchased securities value, a lending value sold securities value, a lending value purchase asset value, a margin call threshold value, a cash debited future value, a loan cash debit future value, a collateral delta due to LV value, a collateral delta due to price value, a collateral delta due to foreign exchange (FX) value, a cash delta due to FX value, a cash lending value change value, an artificial intelligence cause of margin call value, and a cause of margin call value.

At step S408, an individual securities portfolio of interest may be evaluated using the margin call models to determine a first set of information relating to whether to trigger a margin call with respect to the securities portfolio of interest. In an exemplary embodiment, a user may identify a first securities portfolio to MCDCA module 302 for evaluation through an input on a graphical user interface. In another exemplary embodiment, the first set of information relating to whether to trigger the margin call may include information predicting the margin call as a probability metric and information of an actual requirement to trigger a first margin call for the first securities portfolio. In another exemplary embodiment, the evaluating may also include determining the first data patterns, a classification of relevant parameters, and first characteristics for the first securities portfolio. The first data patterns and the first characteristics may correspond to the first securities portfolio and may relate to triggering the first margin call.

Then, in step S410, MCDCA module 302 may then, via a display, display the first set of information on a graphical user interface. In another exemplary embodiment, the first information may include the first data pattern, the first characteristics, and any other data related to the first securities portfolio. In another exemplary embodiment, the first information may be displayed on any connected computing device such as, for example, a computer, a laptop, a smart phone, and a smart watch. The displaying of the information may include, for example, information that is usable by an analyst to decide whether to execute a margin call and/or information that provides a specific recommendation regarding whether to execute a margin call. In another exemplary embodiment, the displaying of the information may also include an alert such as, for example, an alert notification of an impending margin call.

In another exemplary embodiment, the first securities portfolio may be received in a batch of securities portfolios (i.e., one file containing many securities portfolios) or as single, separate entries of each securities portfolio. In another exemplary embodiment, the first securities portfolio may be stored on a connected system and retrieved upon user request (i.e., the user may input a first customer number into a graphical user interface to analyze the first securities portfolio).

In another exemplary embodiment, information relating to triggering a margin call may include probabilities of a margin call for a given securities portfolio. In another exemplary embodiment, the information may include at least one characteristic relating to and contributing to the probable margin call for the given securities portfolio.

In another exemplary embodiment, a user may select a particular data pattern and a corresponding characteristic from the graphical user interface. The selected data pattern and the corresponding characteristic may relate to a triggering of a margin call for the securities portfolio currently analyzed. After selection of the data pattern and the corresponding characteristic by the user, the graphical user interface may display targeted margin call information based on the selection.

In another exemplary embodiment, the graphical user interface may display the margin call information in a variety of format such as, for example, in a dashboard. The dashboard may display additional information relating to the securities portfolio such as, for example, monitoring information relating to the securities portfolio and classification information relating to a determined characteristic as well as margin call information.

In another exemplary embodiment, the graphical user interface may include graphical elements such as, for example, a text box, a selection plane, and a flagging feature to receive feedback information from a user. The feedback information may include data such as, for example, a first information accuracy ranking, a second information accuracy ranking, and a characteristic accuracy ranking. The feedback information may also include the accuracy of the predicted information corresponding to a specific data pattern. In another exemplary embodiment, the feedback information may be utilized to update the margin call model to increase the predictive accuracy and the analytical accuracy of the margin call model. As will be appreciated by a person of ordinary skill in the art, the margin call model may be updated based on machine learning techniques such as, for example, training the margin call model based on the feedback information.

Figure 5:
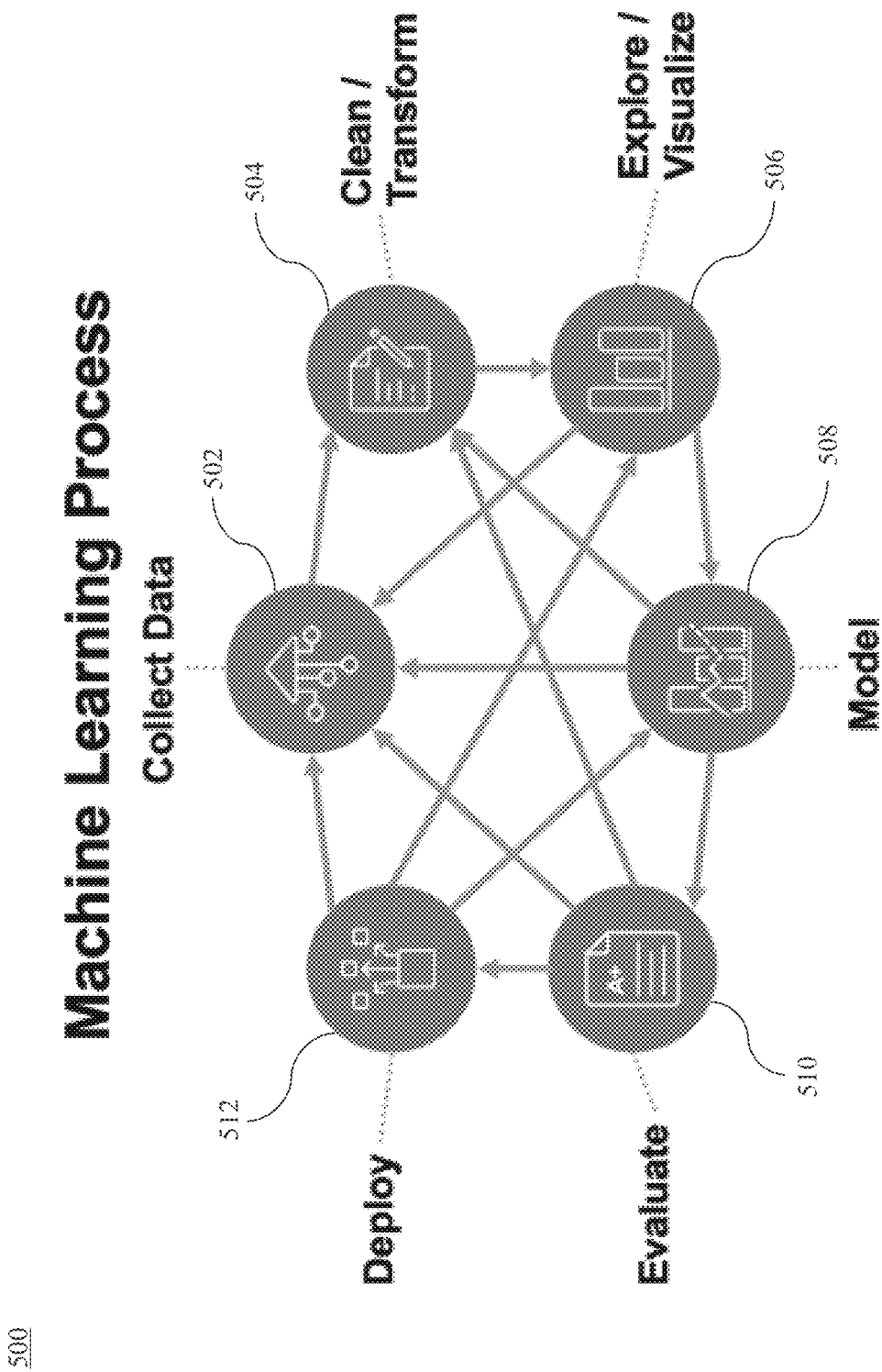
FIG. 5 is a diagram of a machine learning process that is usable for implementing a method for identifying and capturing all relevant features involved in a margin call process so that the root cause can be automatically identified by using machine learning, according to an exemplary embodiment.

FIG. 5 is diagram 500 of a machine learning process that is usable for implementing a method for identifying and capturing all relevant features involved in a margin call process so that the root cause can be automatically identified by using machine learning, according to an exemplary embodiment. FIG. 5 illustrates the interconnectedness of various steps in the machine learning process. In an exemplary embodiment, the steps may include "Collect Data" 502, "Clean/Transform" 504, "Explore/Visualize" 506, "Model" 508, "Evaluate" 510, and "Deploy" 512, where the different steps can be executed on a regular basis in order to improve accuracy as more data from previous margin calls is available. New data is retrofitted to the system in order to learn from previous margin calls.

As illustrated in FIG. 5, the machine learning process may begin at collect data step 502. The collected data may then be cleaned to remove unnecessary information and transformed into a processable data format at clean/transform step 504. Next, the cleaned/transformed data may move to explore/visualize step 506 where useable information such as, for example, data patterns and characteristics may be determined. At this step in the process, when the collected data may be insufficient to determine useable information, then the process may move back to collect data step 502 to acquire additional data. However, when usable information has been determined, then models may be generated at model step 508.

Once the models have been generated, the process may either move back to collect data step 502 to gather more data, move back to clean/transform step 504 to further refine the already collected data, or move forward to evaluate step 510. At evaluate step 510, the developed models may be tested to determine the accuracy of the models. When the model is sufficiently accurate based on predetermined criteria, then the process may continue to deploy step 512. However, when additional refinements are required, then the process may move back to either collect data step 502 or clean/transform step 504. At deploy step 512, the models may be used to analyze and predict outcomes for user inputs. After deployment, the machine learning process may be continuously refined using additional collected data, additional usable information, and additional models.

Figure 6:
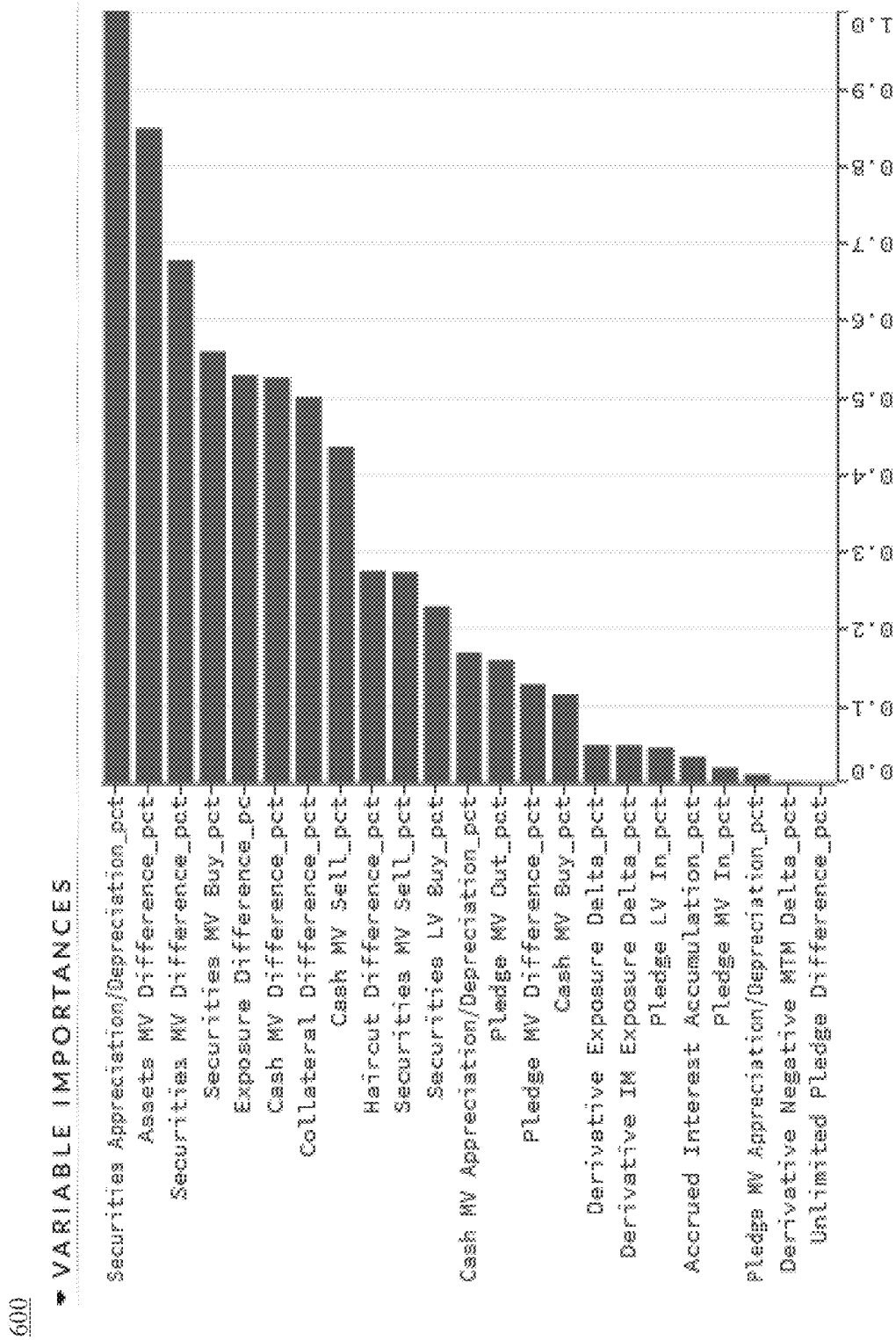
FIG. 6 is a graphical user interface illustrating variable importance of characteristics identified in a method for identifying and capturing all relevant features involved in a margin call process so that the root cause can be automatically identified by using machine learning, according to an exemplary embodiment.

FIG. 6 is graphical user interface 600 illustrating variable importance of characteristics identified in a method for identifying and capturing all relevant features involved in a margin call process so that the root cause can be automatically identified by using machine learning, according to an exemplary embodiment. The graphical user interface illustrated in FIG. 6 has a header "Variable Importances." The graphical user interface may also include a bar graph that has an x-axis illustrating percentages of importance in numbers and a y-axis illustrating contributing characteristics in text. In an exemplary embodiment, the contributing characteristics may be arranged in ascending and descending order according to relative importance such as, for example, the most important characteristic may be arranged at the top of the bar graph, or, vice versa, the most important characteristic may be arranged at the bottom of the bar graph. In another exemplary embodiment, relative importance may include a percentage of each characteristic's contribution to a transaction type, such as, for example, a margin call.

In another exemplary embodiment, the illustrated graph may include any visual representation of data such as, for example, a line graph, a pie chart, a mosaic chart, a spider chart, a stacked bar graph, etc. In another exemplary embodiment, the contributing characteristics may include at least one of a securities appreciation characteristic, a securities depreciation characteristic, an assets market value difference characteristic, a securities market value difference characteristic, a securities market value buy characteristic, an exposure difference characteristic, a cash market value difference characteristic, a collateral difference characteristic, a cash market value sell characteristic, a haircut difference characteristic, a securities market value sell characteristic, a securities liquidation value buy characteristic, a cash market value appreciation characteristic, a cash market value depreciation characteristic, a pledge market value out characteristic, a pledge market value difference characteristic, a cash market value buy characteristic, a derivative exposure delta characteristic, a derivative initial margin exposure delta characteristic, a pledge liquidation value in characteristic, an accrued interest accumulation characteristic, a pledge market value in characteristic, a pledge market value appreciation characteristic, a pledge market value depreciation characteristic, a derivative negative mark-to-market delta characteristic, a lending value fluctuation due to foreign exchange movements characteristic, private equity calls or accrued interest debited with a future value date characteristic, and an unlimited pledge difference characteristic.

Figure 7:
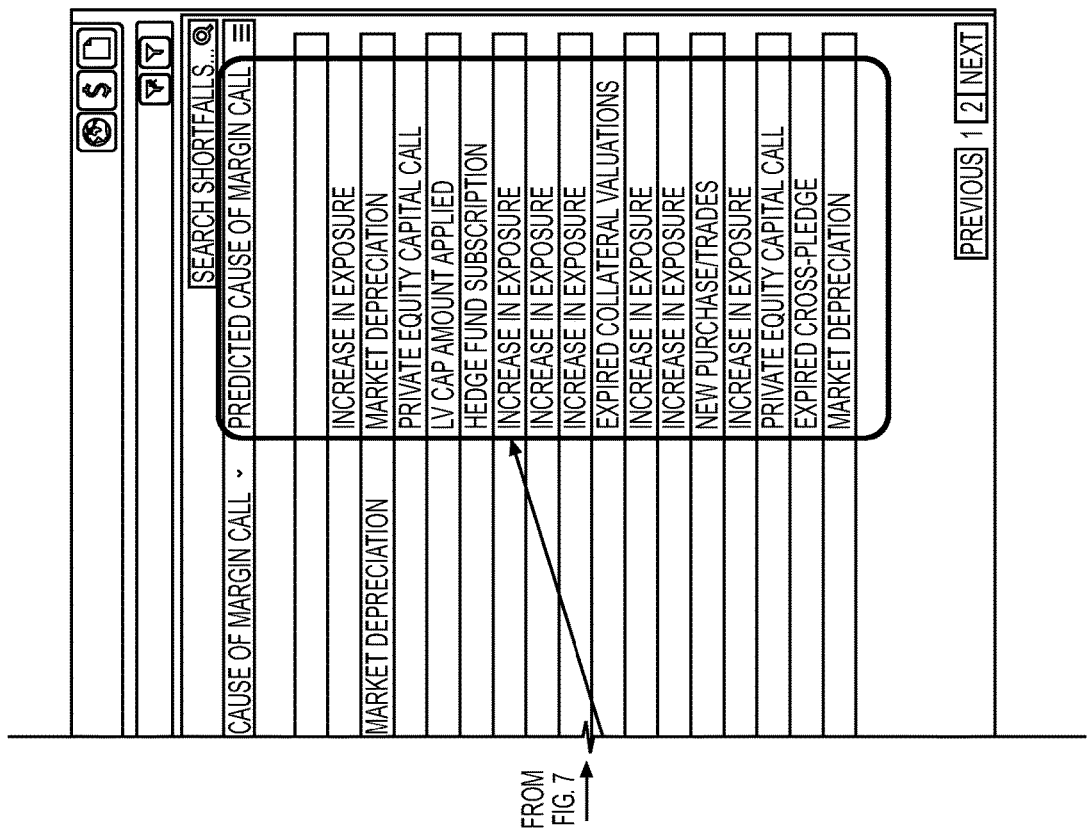
FIG. 7 is a screenshot that illustrates a graphical user interface that is usable for implementing a method for identifying and capturing all relevant features involved in a margin call process so that the root cause can be automatically identified by using machine learning, according to an exemplary embodiment.

FIG. 7 is a screenshot that illustrates graphical user interface 700 that is usable for implementing a method for identifying and capturing all relevant features involved in a margin call process so that the root cause can be automatically identified by using machine learning, according to an exemplary embodiment. Graphical user interface 700 may include an exemplary graphical user interface facilitating interaction between a user and various automatically generated margin call models. As illustrated, graphical user interface 700 may include a sortable table of numerous investors and corresponding securities portfolios. In an exemplary embodiment, the table provides a summarized view of processed securities portfolios. In graphical user interface 700, the table may be sorted according to categories titled "Ticket ID," "Client Name," "Aged," "Aging Bucket," "Client ID," "Capital Advisor," "Credit Executive," "Margin Call Amount USD," "Cause of Margin Call," and "Predicted Cause of Margin Call." Graphical user interface 700 may also include user selectable buttons such as, for example, a filter button and a refresh button to further refine displayed information.

In an exemplary embodiment, the information in graphical user interface 700 may be displayed in any combination of letters, words, and numbers. In another exemplary embodiment, the aging bucket category may display information as a range of days. In another exemplary embodiment, the margin call amount category may display amounts in any user selectable, legally recognized legal tender. In another exemplary embodiment, the cause of margin call category may display the characteristics known to have caused a margin call in the collected data. In another exemplary embodiment, the predicted cause of margin call category may display the characteristics predicted to contribute to a future margin call. In another exemplary embodiment, a comparison of the predicted cause of margin call category and the cause of margin call category for a specific securities portfolio may be used to verify margin call models. In another exemplary embodiment, the predicted cause of data may be transmitted to graphical user interface 700 via an application programing interface (API) such as, for example, a Representational State Transfer (REST) API by data management software such as, for example, SPLUNK.

Figure 8:
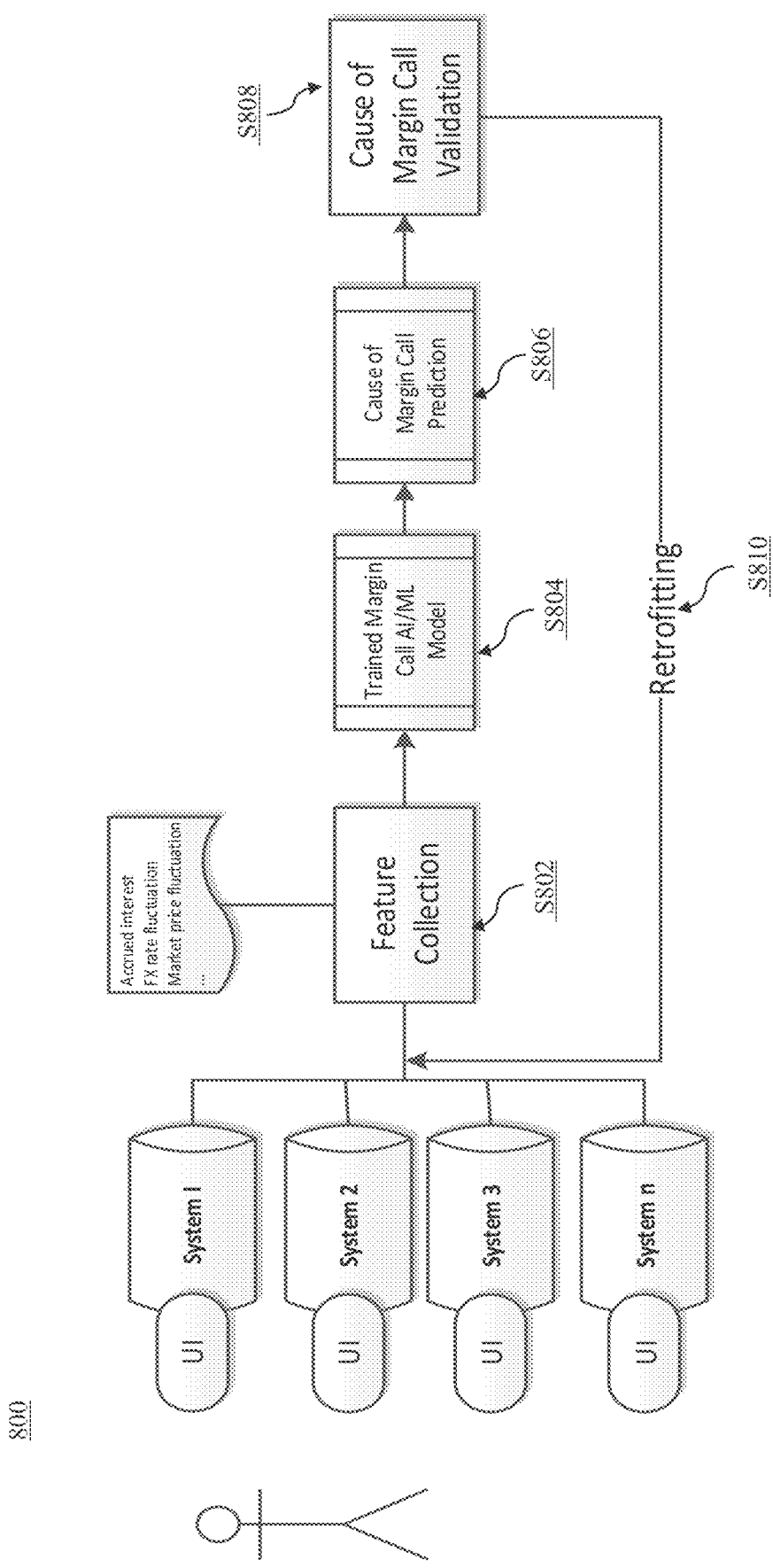
FIG. 8 is a flowchart of an exemplary process for implementing a method for identifying and capturing all relevant features involved in a margin call process so that the root cause can be automatically identified by using machine learning.

FIG. 8 is a flowchart 800 of an exemplary process for implementing a method for identifying and capturing all relevant features involved in a margin call process so that the root cause can be automatically identified by using machine learning. As illustrated, flowchart 800 may include a user interface operable on various user terminals labeled "system 1," "system 2," "system 3," and "system n." The user terminals may be connected to a system configured to implement a method for identifying and capturing all relevant features involved in a margin call process so that the root cause can be automatically identified by using machine learning.

The exemplary process in flowchart 800 begins at step S802 with the collection of features relating to shared characteristics of margin calls. The collected features may include, for example, accrued interest FX rate fluctuation and market price fluctuation. Then, at step S804, a margin call model may be trained by artificial intelligence (AI) or machine learning (ML) techniques using the collected features. At step S806, a cause of margin call may be predicted using the trained margin call model. The predicted cause of the margin call may then be validated at step S808 with known outcomes to further refine the developed margin call model. Finally, at step S810, retrofitting of the model may be accomplished by repetition of the steps with additional collected features to further train the developed margin call model.

Figure 9:
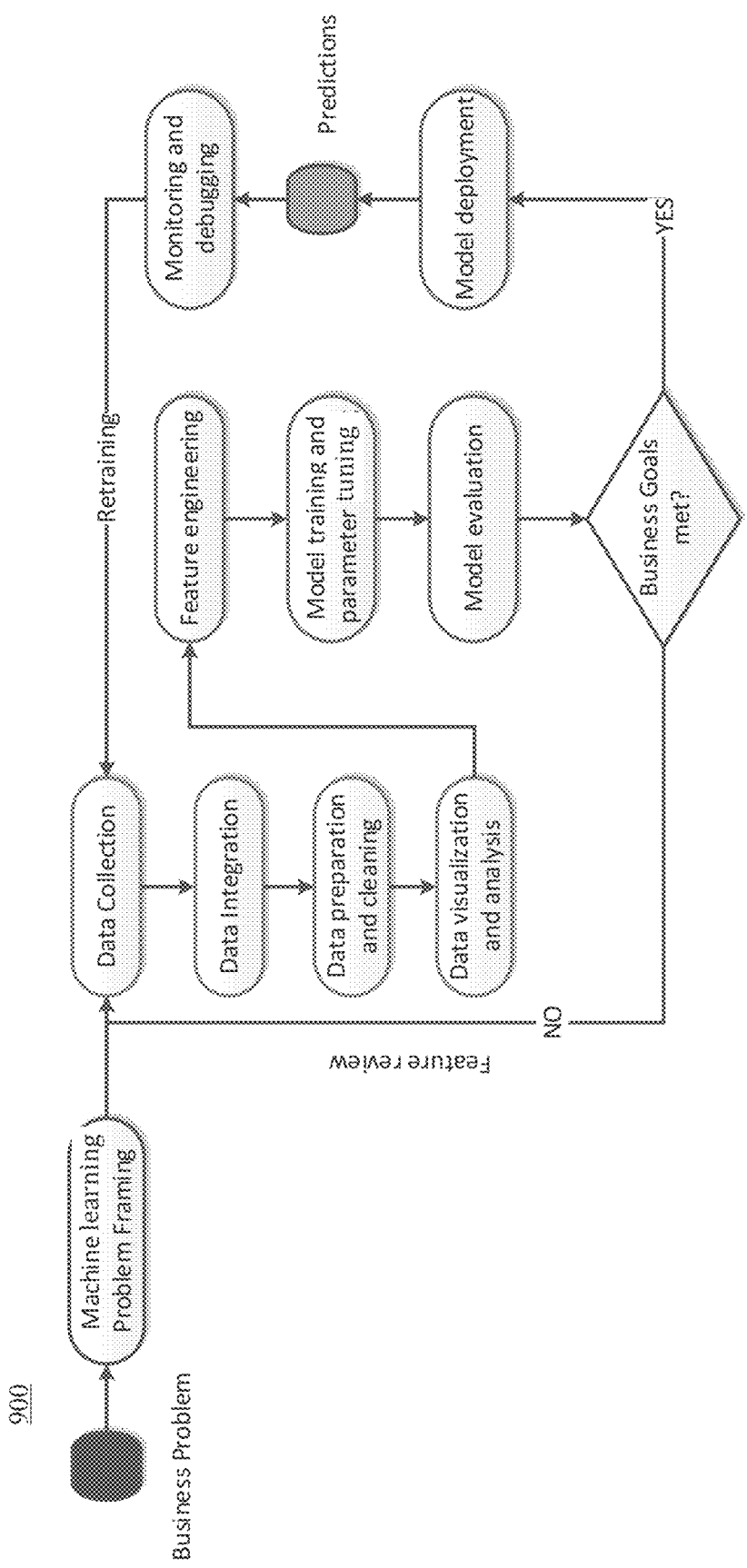
FIG. 9 is a flowchart of an exemplary process for implementing a method for identifying and capturing all relevant features involved in a margin call process so that the root cause can be automatically identified by using machine learning.

FIG. 9 is a flowchart 900 of an exemplary process for implementing a method for identifying and capturing all relevant features involved in a margin call process so that the root cause can be automatically identified by using machine learning. As illustrated, flowchart 900 begins with a business problem that may be solved using machine learning techniques. A machine learning problem framing method may be used to frame the business problem to identify possible technical solutions relating to machine learning techniques, which may be used to solve the business problem. Once the business problem has been framed, implementation of the machine learning techniques may begin with collection of data pertinent to the business problem. The collected data may be integrated with other pertinent data, cleaned, and prepared for data visualization and analysis. Feature engineering of the analyzed and visualized data uses domain knowledge of the data to create features relating to attributes or properties of the business problem.

The engineered features may then be used to train developed models and tune parameters. The trained models may then be evaluated using known outcomes to determine whether business goals relating to a solution to the business problem are met. A determination that the business goals have not been met results in a review of the engineered features, which may result in reimplementation of the machine learning technique beginning with data collection. However, when a determination that the business goals have been met, the developed model may be deployed to predict and resolve the business problem. The model may be maintained after deployment using monitoring and debugging techniques which may continuously retrain the model using newly collected data.

Figure 10:
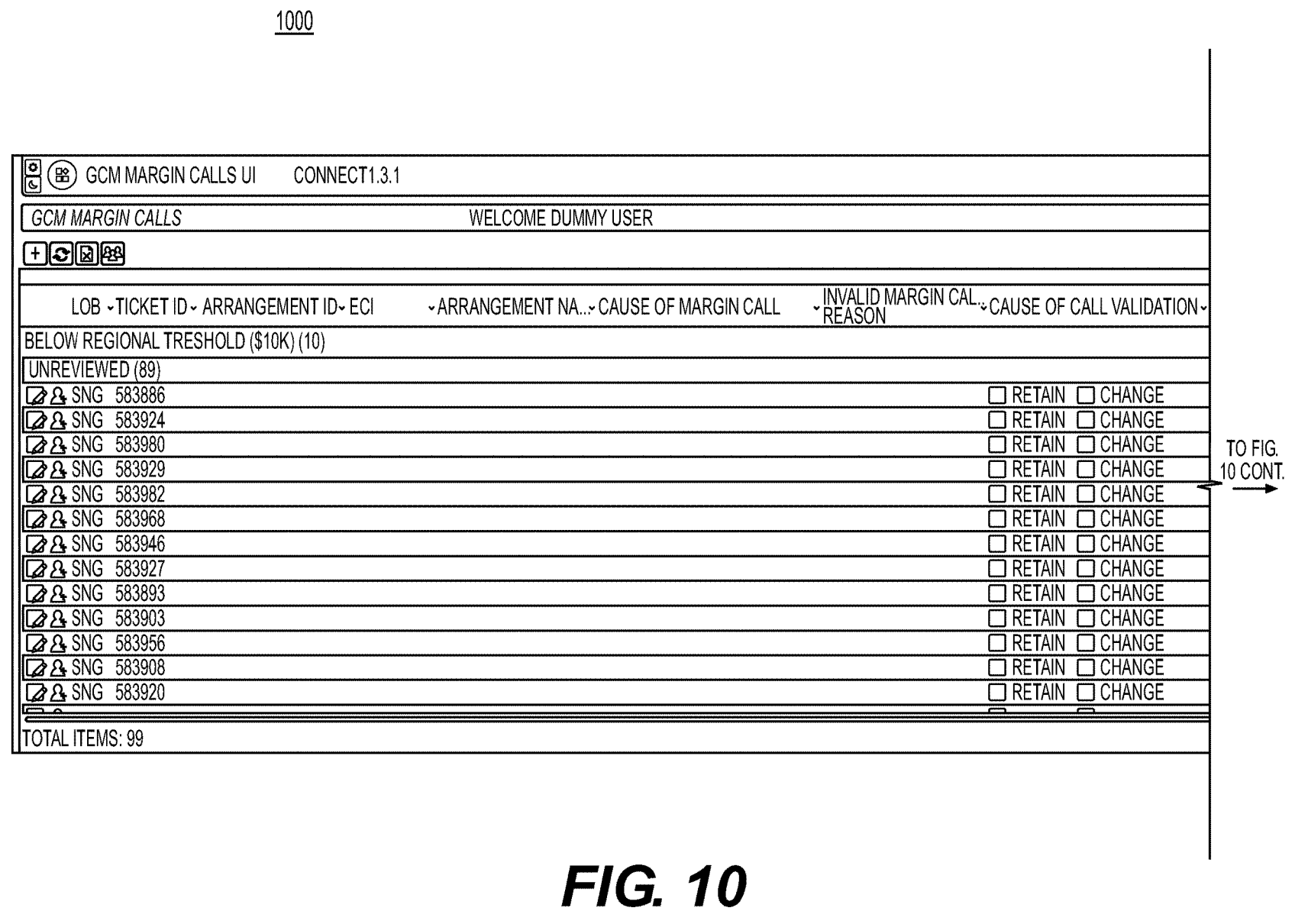

FIG. 10 is a screenshot 1000 that illustrates a graphical user interface of unclassified tickets that is usable for implementing a method for identifying and capturing all relevant features involved in a margin call process so that the root cause can be automatically identified by using machine learning, according to an exemplary embodiment. As illustrated in FIG. 10, the unclassified tickets are displayed in a margin call tool consistent with embodiments in the present application. The margin call tool may include a table that contains a plurality of unclassified tickets and a counter titled "Unreviewed" that counts the number of unclassified tickets.

Figure 11:
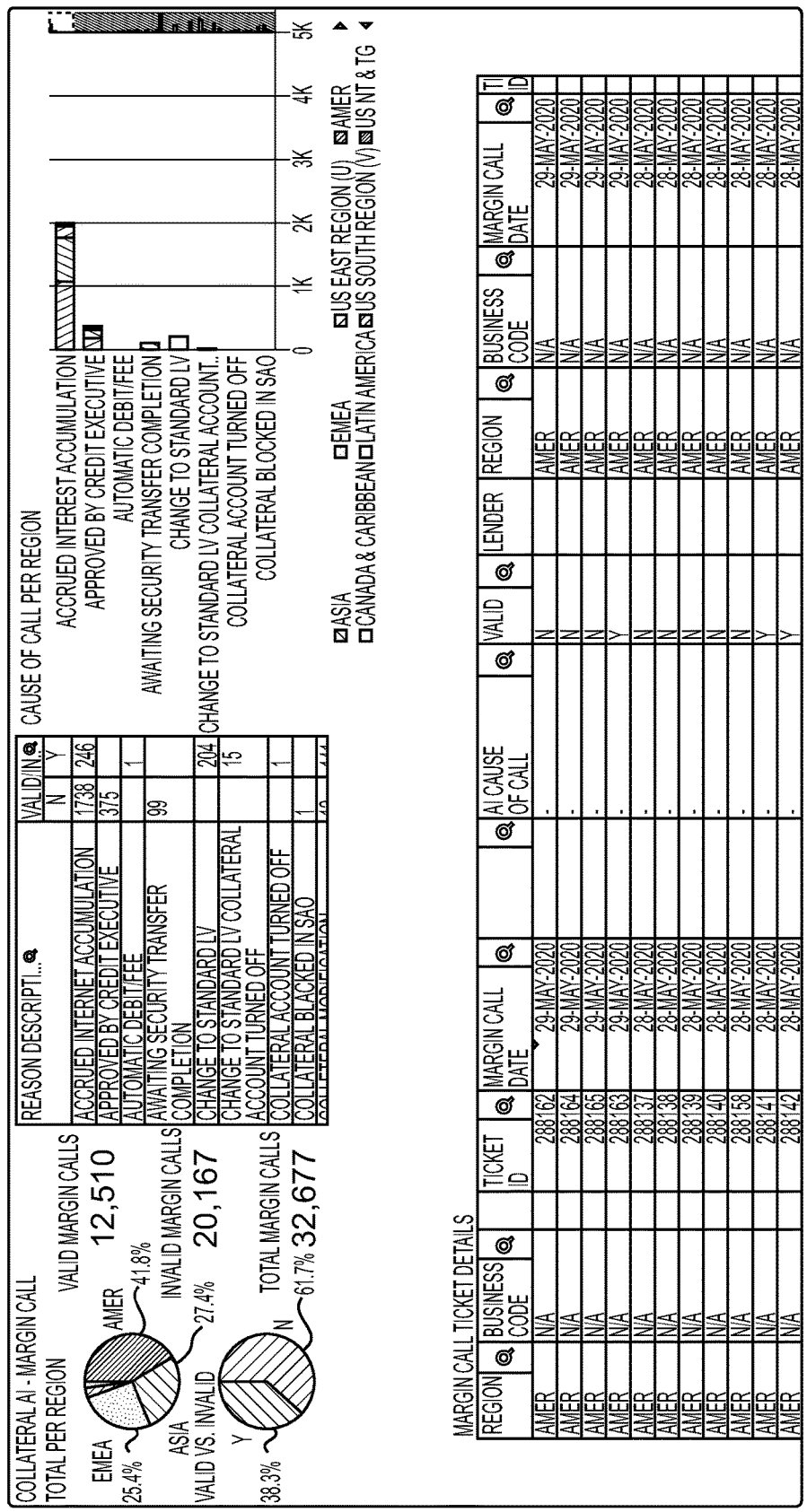
FIG. 11 is a screenshot that illustrates a graphical user interface of an unclassified ticket dashboard that is usable for implementing a method for identifying and capturing all relevant features involved in a margin call process so that the root cause can be automatically identified by using machine learning, according to an exemplary embodiment.

FIG. 11 is a screenshot 1100 that illustrates a graphical user interface of an unclassified ticket dashboard that is usable for implementing a method for identifying and capturing all relevant features involved in a margin call process so that the root cause can be automatically identified by using machine learning, according to an exemplary embodiment. As illustrated in FIG. 11, the unclassified ticket dashboard provides information for a plurality of tickets. In an exemplary embodiment, the unclassified ticket dashboard shows tickets without artificial intelligence classification and may also include historical margin calls that have previously been classified.

FIG. 12 is a screenshot 1200 that illustrates a graphical user interface of classification confirmation that is usable for implementing a method for identifying and capturing all relevant features involved in a margin call process so that the root cause can be automatically identified by using machine learning, according to an exemplary embodiment. As illustrated in FIG. 12, a confirmation email may be received within a specified amount of time to confirm successful classification of selected data. The confirmation email may include information corresponding to the selected data classified. As will be appreciated by a person of ordinary skill in the art, the confirmation email may be received by any email client such as, for example, a proprietary email client and a third-party developed email client.

FIG. 13 is a screenshot 1300 that illustrates a graphical user interface of classified tickets that is usable for implementing a method for identifying and capturing all relevant features involved in a margin call process so that the root cause can be automatically identified by using machine learning, according to an exemplary embodiment. As illustrated in FIG. 13, the classified tickets are displayed in a margin call tool consistent with embodiments in the present application. The tickets successfully classified by the artificial intelligence are displayed on the margin call tool.

Figure 14A:
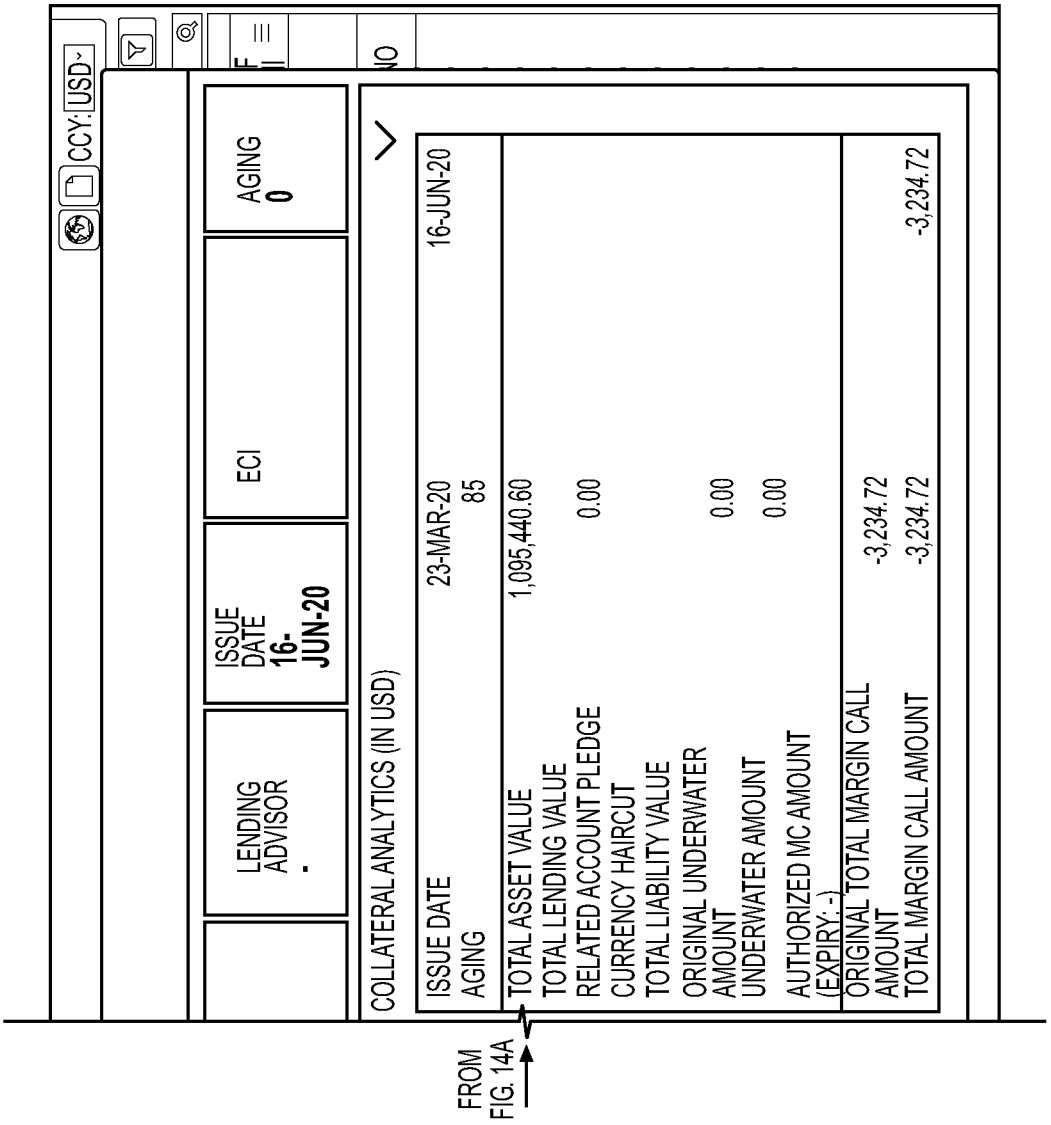
FIG. 14A is a screenshot that illustrates a graphical user interface of artificial intelligence features that is usable for implementing a method for identifying and capturing all relevant features involved in a margin call process so that the root cause can be automatically identified by using machine learning, according to an exemplary embodiment.

FIG. 14A is a screenshot 1400A that illustrates a graphical user interface of artificial intelligence features that is usable for implementing a method for identifying and capturing all relevant features involved in a margin call process so that the root cause can be automatically identified by using machine learning, according to an exemplary embodiment. As illustrated in FIG. 14A, the classified tickets are displayed in a margin call tool consistent with embodiments in the present application. The margin call tool may also provide available ticket details that includes artificial intelligence classification features and attributes.

FIG. 14B is a screenshot 1400B that illustrates a graphical user interface of ticket details that is usable for implementing a method for identifying and capturing all relevant features involved in a margin call process so that the root cause can be automatically identified by using machine learning, according to an exemplary embodiment. As illustrated in FIG. 14B, the classified tickets are displayed in a margin call tool consistent with embodiments in the present application. The margin call tool may also provide available ticket details for a particular ticket such as, for example, the ticket identifier, the determined cause of margin call the ticket, and relevant attribute values that were used to determine the cause of margin call.

Figure 15:
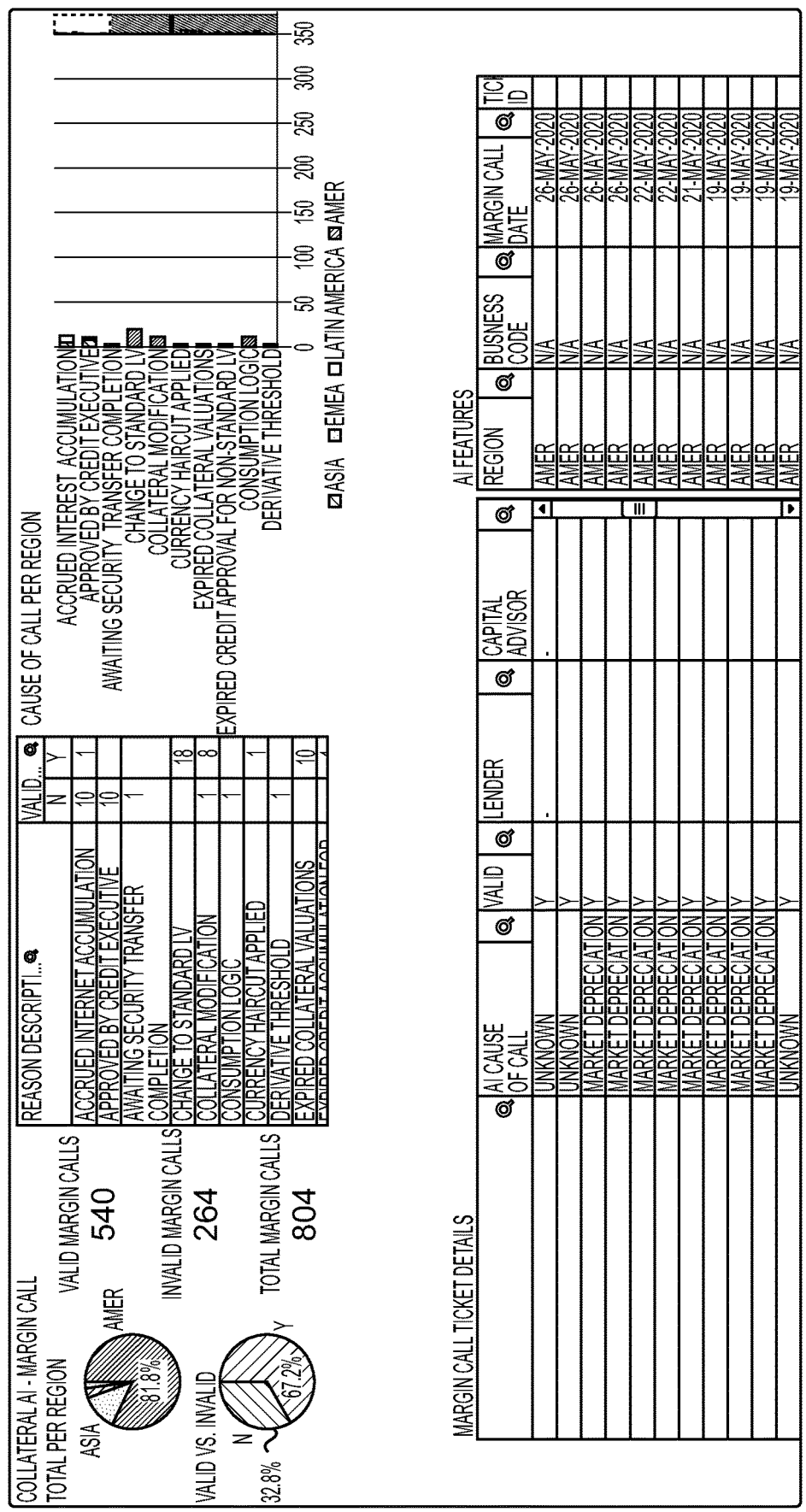
FIG. 15 is a screenshot that illustrates a graphical user interface of a classified ticket dashboard that is usable for implementing a method for identifying and capturing all relevant features involved in a margin call process so that the root cause can be automatically identified by using machine learning, according to an exemplary embodiment.

FIG. 15 is a screenshot 1500 that illustrates a graphical user interface of a classified ticket dashboard that is usable for implementing a method for identifying and capturing all relevant features involved in a margin call process so that the root cause can be automatically identified by using machine learning, according to an exemplary embodiment. As illustrated in FIG. 15, the classified tickets are displayed in a dashboard consistent with embodiments in the present application. The dashboard may display the artificial intelligence classified tickets together with data corresponding to the analysis. The data may include a number of valid margin calls, a number of invalid margin calls, and a number of total margin calls. The dashboard may also present the data in graphical elements such as, for example, a bar graph of causes of margin call per region.

Figure 16:
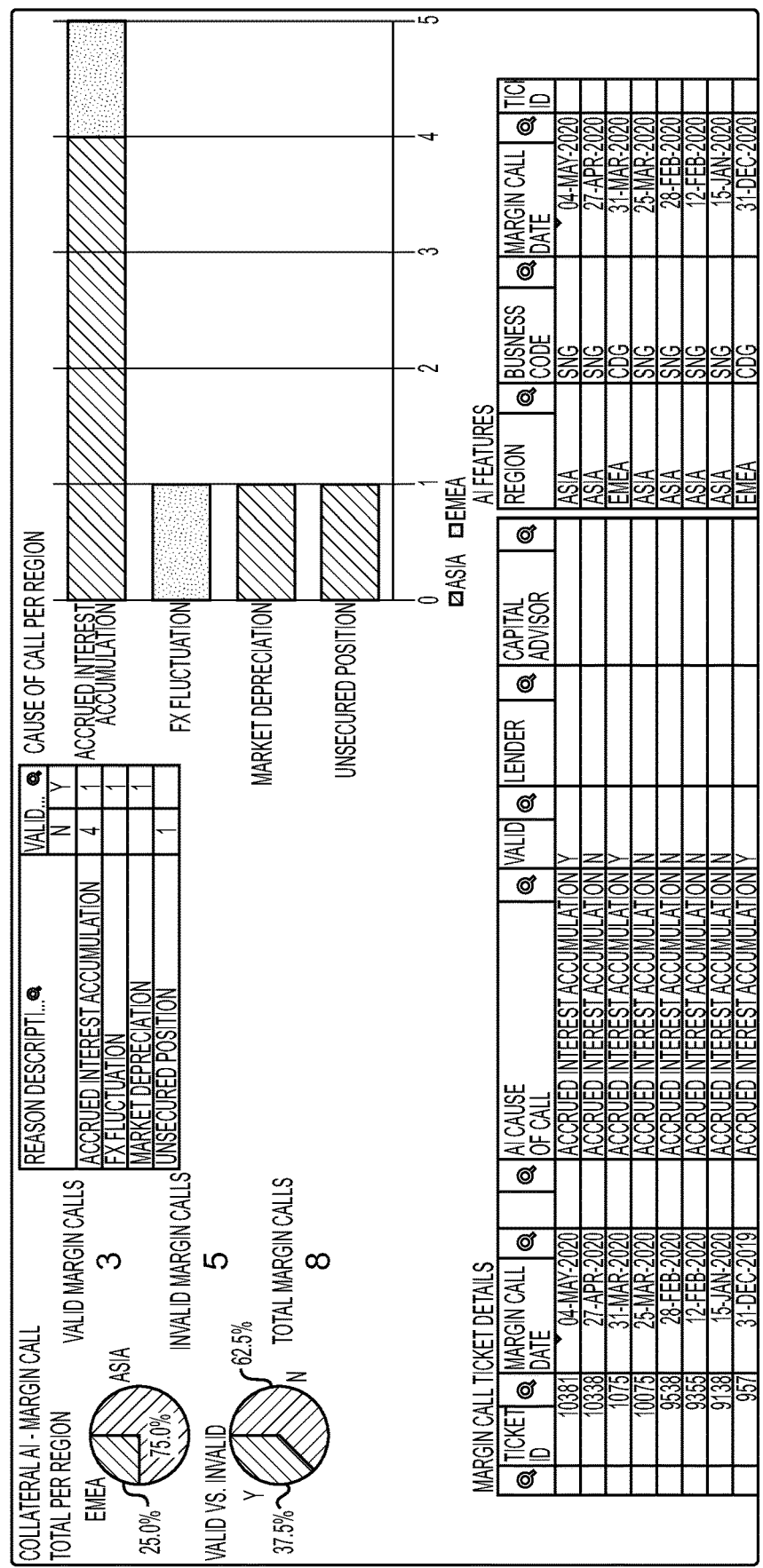
FIG. 16 is a screenshot that illustrates a graphical user interface of model accuracy that is usable for implementing a method for identifying and capturing all relevant features involved in a margin call process so that the root cause can be automatically identified by using machine learning, according to an exemplary embodiment.

FIG. 16 is a screenshot 1600 that illustrates a graphical user interface of model accuracy that is usable for implementing a method for identifying and capturing all relevant features involved in a margin call process so that the root cause can be automatically identified by using machine learning, according to an exemplary embodiment. As illustrated in FIG. 16, model analysis data are displayed in a dashboard consistent with embodiments in the present application. The dashboard may show artificial intelligence analysis accuracy for the current model on a given cause of margin call, such as, for example, an accrued interest cause. The model analysis data may include a number of valid margin calls, a number of invalid margin calls, and a number of total margin calls. The dashboard may also present the data in graphical elements such as, for example, a bar graph of causes of margin call per region.

Figure 17:
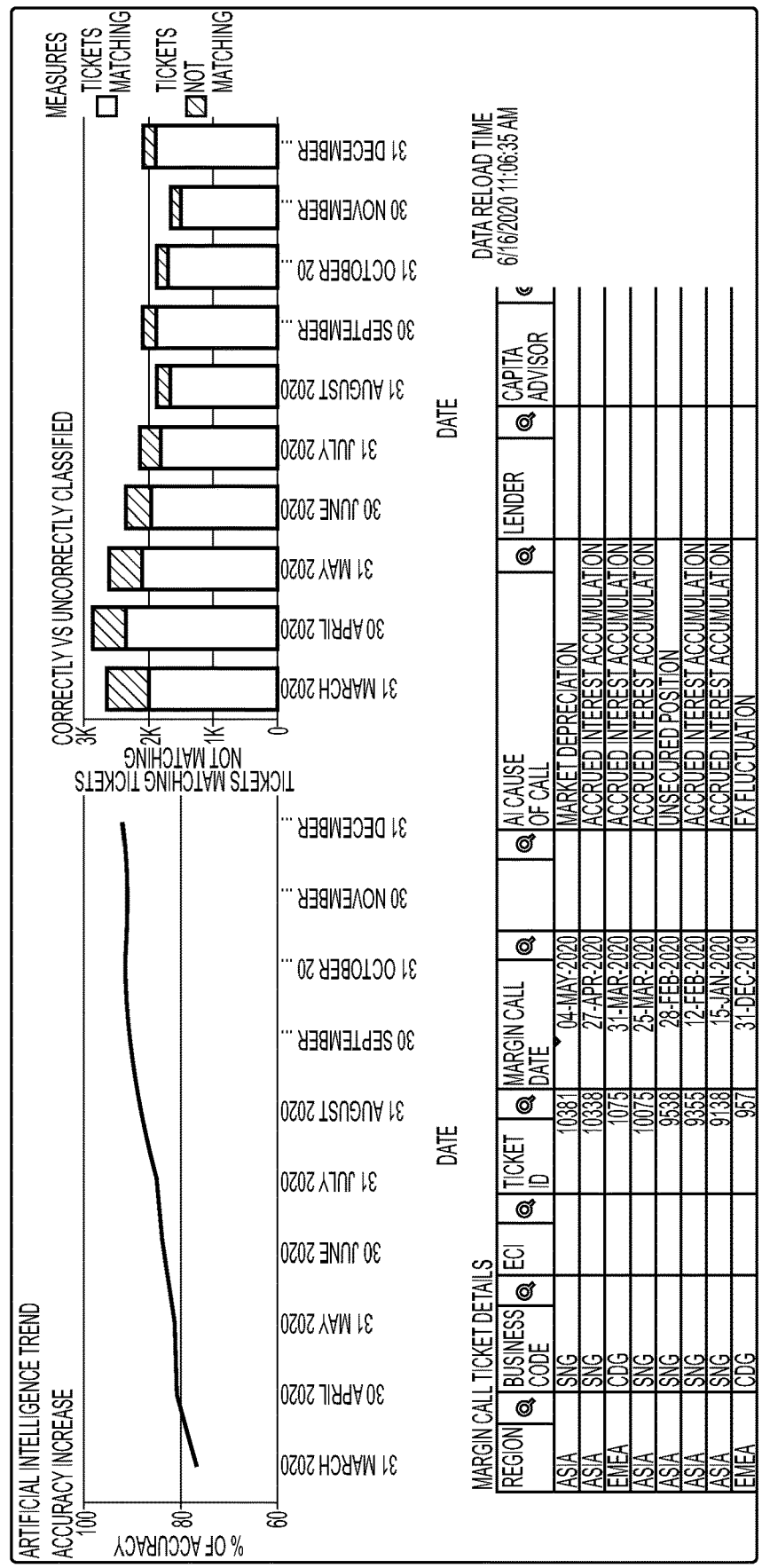
FIG. 17 is a screenshot that illustrates a graphical user interface of accuracy monitoring that is usable for implementing a method for identifying and capturing all relevant features involved in a margin call process so that the root cause can be automatically identified by using machine learning, according to an exemplary embodiment.

FIG. 17 is a screenshot 1700 that illustrates a graphical user interface of accuracy monitoring that is usable for implementing a method for identifying and capturing all relevant features involved in a margin call process so that the root cause can be automatically identified by using machine learning, according to an exemplary embodiment. As illustrated in FIG. 17, historical model data are displayed in a dashboard consistent with embodiments in the present application. The dashboard may show graphical illustrations representing monitoring of accuracy improvements as a function of time as more data is utilized for training by the model. The graphical illustrations may include graphs such as, for example, a line graph and a bar graph that tracks accuracy increases for the model as a function of time.

Figure 18:
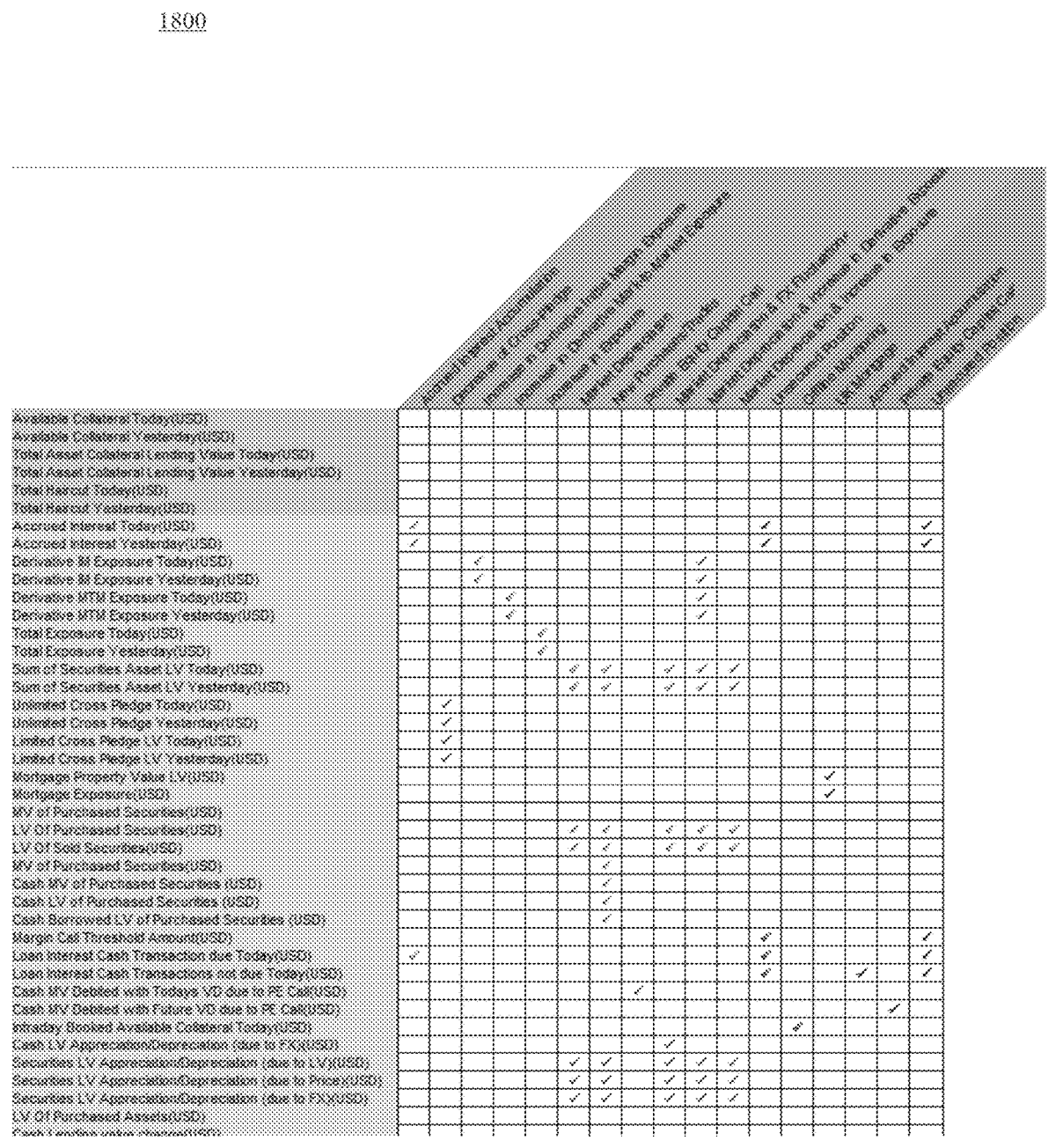

FIG. 18 is a show model 1800 illustrating feature interactions that is usable for implementing a method for identifying and capturing all relevant features involved in a margin call process so that the root cause can be automatically identified by using machine learning, according to an exemplary embodiment. As illustrated in FIG. 18, interactions between variables and characteristics may be highlighted in chart form. As will be appreciated by a person of ordinary skill in the art, the variables and the characteristics may be presented either on the X-axis or the Y-axis of a chart such that an intersecting square indicates an interaction between a particular variable and a particular characteristic.

FIG. 19A is a screenshot 1900A that illustrates a graphical user interface of a user feedback form that is usable for implementing a method for identifying and capturing all relevant features involved in a margin call process so that the root cause can be automatically identified by using machine learning, according to an exemplary embodiment. Screenshot 1900A provides for a graphical user element such as, for example, a menu or other utility window that is presented to a user.

As illustrated in FIG. 19A, the graphical user element may include a user feedback form relating to the artificial intelligence classification outcome. In an exemplary embodiment, the data gathered from the user feedback form may be used to further train the margin call model by using techniques consistent with embodiments in the present application to improve classification accuracy. The user feedback form may include information corresponding to a particular ticket as well as user selectable graphical elements to receive user input.

FIG. 19B is a screenshot 1900B that illustrates an expanded graphical user interface that is displayed based on user input in a user feedback form that is usable for implementing a method for identifying and capturing all relevant features involved in a margin call process so that the root cause can be automatically identified by using machine learning, according to an exemplary embodiment. Screenshot 1900B provides for an expanded graphical user element such as, for example, a menu or other utility window that is presented to a user. The expanded graphical user element may be presented to a user based on a user input received from the graphical user element in FIG. 19A.

As illustrated in FIG. 19B, the graphical user element may include an expanded user feedback form relating to the artificial intelligence classification outcome. In an exemplary embodiment, the data gathered from the expanded user feedback form may be used to further train the margin call model by using techniques consistent with embodiments in the present application to improve classification accuracy. The expanded user feedback form may display information based on a user selection in a previous graphical user element. The expanded user feedback form may include additional information corresponding to a particular ticket as well as additional user selectable graphical elements to receive user input.

Accordingly, with this technology, an optimized process for identifying and capturing all relevant features involved in a margin call process so that the root cause can be automatically identified by using machine learning is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for providing information that relates to triggering a margin call with respect to a first securities portfolio, the method being implemented by at least one processor, the method comprising:

obtaining, by the at least one processor, a plurality of data relating to a plurality of securities portfolios from a public data source and a private data source;

parsing, by the at least one processor, the plurality of data;

identifying, by the at least one processor in the parsed plurality of data, personally identifiable information that corresponds to at least one investor;

removing, by the at least one processor, the identified personally identifiable information from the plurality of data and anonymizing remaining data of the plurality of data;

automatically determining, by the at least one processor using the anonymized data, at least one data pattern relating to triggering the margin call and at least one corresponding characteristic contributing to triggering the margin call by, identifying, by the at least one processor, at least one contributing factor to the margin call from the anonymized data;

determining, by the at least one processor, a magnitude of impact for each of the at least one contributing factor, the magnitude of impact including a percentage of contribution to the margin call and a probability percentage of contribution to the margin call; and determining, by the at least one processor, the at least one corresponding characteristic from the at least one contributing factor based on the magnitude of impact;

automatically generating, by the at least one processor and in a memory, at least one model based on the at least one data pattern and the at least one characteristic;

training, by the at least one processor, the at least one model by using the anonymized data;

assessing, by the at least one processor, the trained at least one model by, determining, by the at least one processor for the trained at least one model, whether a true positive rate, a true negative rate, a false positive rate, and a false negative rate correspond to a predetermined range;

determining whether an accuracy level of the trained at least one model developed using the anonymized data is sufficient based on a predetermined criteria;

when the at least one model is determined not to be sufficiently accurate, iteratively gathering additional data and modifying the trained at least one model by incorporating the additional data until the accuracy level of the at least one model is determined to be sufficient according to the predetermined criteria;

deploying the at least one model when the at least one model is determined to be sufficiently accurate;

evaluating, by the at least one processor based on a result of the assessment, the first securities portfolio using the deployed at least one model by, determining, by the at least one processor using the deployed at least one model, a first information relating to whether to trigger a first margin call with respect to the first securities portfolio, wherein the first information includes a probability metric and a corresponding trigger requirement;

automatically determining, by the at least one processor using the deployed at least one model, at least one recommended action based on the first information;

receiving, by the at least one processor via a graphical user interface, feedback information from at least one user; and refining the deployed at least one model based on the at least one recommended action that is automatically determined and the feedback information.

2. The method of claim 1, wherein the evaluating further comprises:

selecting, by the at least one processor, a first one of the at least one data pattern and a first one of the at least one corresponding characteristic relating to triggering the first margin call for the first securities portfolio; and displaying, by the at least one processor via a display, the first information on a graphical user interface together with the selected first one of the at least one data pattern and the selected first one of the at least one corresponding characteristic.

3. The method of claim 1, wherein the at least one model is generated automatically using machine learning analysis of the anonymized data.

4. The method of claim 1, wherein the at least one model includes at least one from among a data model, a mathematical model, a process model, and a machine learning model.

5. The method of claim 1, further comprising:

evaluating, by the at least one processor, a second securities portfolio using the at least one model to determine a second information relating to whether to trigger a future second margin call with respect to the second securities portfolio; and displaying, by the at least one processor via a display, the second information on a graphical user interface.

6. The method of claim 5, wherein the graphical user interface includes at least one dashboard that displays at least one from among monitoring information relating to the first securities portfolio and classification information relating to the at least one characteristic.

7. The method of claim 1, wherein the at least one characteristic includes a securities appreciation characteristic, a securities depreciation characteristic, an assets market value difference characteristic, a securities market value difference characteristic, a securities market value buy characteristic, an exposure difference characteristic, a cash market value difference characteristic, a collateral difference characteristic, a cash market value sell characteristic, a haircut difference characteristic, a securities market value sell characteristic, a securities liquidation value buy characteristic, a cash market value appreciation characteristic, a cash market value depreciation characteristic, a pledge market value out characteristic, a pledge market value difference characteristic, a cash market value buy characteristic, a derivative exposure delta characteristic, a derivative initial margin exposure delta characteristic, a pledge liquidation value in characteristic, an accrued interest accumulation characteristic, a pledge market value in characteristic, a pledge market value appreciation characteristic, a pledge market value depreciation characteristic, a derivative negative mark-to-market delta characteristic, a lending value fluctuation due to foreign exchange movements characteristic, private equity calls or accrued interest debited with a future value date characteristic, and an unlimited pledge difference characteristic.

8. The method of claim 1, wherein the feedback information includes a first information accuracy ranking, a second information accuracy ranking, and a characteristic accuracy ranking.

9. A computing device configured to implement an execution of a method for providing information that relates to triggering a margin call with respect to a first securities portfolio, the computing device comprising:

a processor;

a memory; and a communication interface coupled to each of the processor and the memory, wherein the processor is configured to:

obtain a plurality of data relating to a plurality of securities portfolios from a public data source and a private data source;

parse the plurality of data;

identify, in the parsed plurality of data, personally identifiable information that corresponds to at least one investor;

remove the identified personally identifiable information from the plurality of data and anonymize remaining data of the plurality of data;

automatically determine, by using the anonymized data, at least one data pattern relating to triggering the margin call and at least one corresponding characteristic contributing to triggering the margin call by causing the processor to:

identify at least one contributing factor to the margin call from the anonymized data, determine a magnitude of impact for each of the at least one contributing factor, the magnitude of impact including a percentage of contribution to the margin call and a probability percentage of contribution to the margin call; and determine the at least one corresponding characteristic from the at least one contributing factor based on the magnitude of impact;

automatically generate, in the memory, at least one model based on the at least one data pattern and the at least one characteristic;

train the at least one model by using the anonymized data;

assess the trained at least one model by causing the processor to, determine, for the trained at least one model, whether a true positive rate, a true negative rate, a false positive rate, and a false negative rate correspond to a predetermined range;

determine whether an accuracy level of the trained at least one model developed using the anonymized data is sufficient based on a predetermined criteria;

when the at least one model is determined not to be sufficiently accurate, iteratively gather additional data and modify the trained at least one model by incorporating the additional data until the accuracy level of the at least one model is determined to be sufficient according to the predetermined criteria;

deploy the at least one model when the at least one model is determined to be sufficiently accurate;

evaluate, based on a result of the assessment, the first securities portfolio using the deployed at least one model by causing the processor to, determine, by using the at least one model, a first information relating to whether to trigger a first margin call with respect to the first securities portfolio, wherein the first information includes a probability metric and a corresponding trigger requirement;

automatically determine, by using the deployed at least one model, at least one recommended action based on the first information;

receive, via a graphical user interface, feedback information from at least one user; and refine the deployed at least one model based on the at least one recommended action that is automatically determined and the feedback information.

10. The computing device of claim 9, wherein, for the evaluating, the processor is further configured to:

select a first one of the at least one data pattern and a first one of the at least one corresponding characteristic relating to triggering the first margin call for the first securities portfolio; and display, via a display, the first information on a graphical user interface together with the selected first one of the at least one data pattern and the selected first one of the at least one corresponding characteristic.

11. The computing device of claim 9, wherein the processor is further configured to automatically generate the at least one model by using machine learning analysis of the anonymized data.

12. The computing device of claim 9, wherein the at least one model includes at least one from among a data model, a mathematical model, a process model, and a machine learning model.

13. The computing device of claim 9, wherein the processor is further configured to:

evaluate a second securities portfolio using the at least one model to determine a second information relating to whether to trigger a future second margin call with respect to the second securities portfolio; and display, via a display, the second information on a graphical user interface.

14. The computing device of claim 13, wherein the graphical user interface includes at least one dashboard that displays at least one from among monitoring information relating to the first securities portfolio and classification information relating to the at least one characteristic.

15. The computing device of claim 9, wherein the at least one characteristic includes a securities appreciation characteristic, a securities depreciation characteristic, an assets market value difference characteristic, a securities market value difference characteristic, a securities market value buy characteristic, an exposure difference characteristic, a cash market value difference characteristic, a collateral difference characteristic, a cash market value sell characteristic, a haircut difference characteristic, a securities market value sell characteristic, a securities liquidation value buy characteristic, a cash market value appreciation characteristic, a cash market value depreciation characteristic, a pledge market value out characteristic, a pledge market value difference characteristic, a cash market value buy characteristic, a derivative exposure delta characteristic, a derivative initial margin exposure delta characteristic, a pledge liquidation value in characteristic, an accrued interest accumulation characteristic, a pledge market value in characteristic, a pledge market value appreciation characteristic, a pledge market value depreciation characteristic, a derivative negative mark-to-market delta characteristic, a lending value fluctuation due to foreign exchange movements characteristic, private equity calls or accrued interest debited with a future value date characteristic, and an unlimited pledge difference characteristic.

16. The computing device of claim 9, wherein the feedback information includes a first information accuracy ranking, a second information accuracy ranking, and a characteristic accuracy ranking.

* * * * *